US012489233B2

(12) United States Patent
Komoto

(10) Patent No.: US 12,489,233 B2
(45) Date of Patent: Dec. 2, 2025

(54) ELECTRICAL CONNECTOR WITH CONTACT ASSEMBLY INTEGRALLY FORMED WITH HOUSING BY INSERT MOLDING

(71) Applicant: Japan Aviation Electronics Industry, Ltd., Tokyo (JP)

(72) Inventor: Tetsuya Komoto, Tokyo (JP)

(73) Assignee: Japan Aviation Electronics Industry, Ltd., Tokyo (JP)

( * ) Notice: Subject to any disclaimer, the term of this patent is extended or adjusted under 35 U.S.C. 154(b) by 329 days.

(21) Appl. No.: 18/157,102

(22) Filed: Jan. 20, 2023

(65) Prior Publication Data

US 2023/0282998 A1 Sep. 7, 2023

(30) Foreign Application Priority Data

Mar. 7, 2022 (JP) ................................ 2022-034067

(51) Int. Cl.
*H01R 12/71* (2011.01)
*H01R 12/57* (2011.01)
(Continued)

(52) U.S. Cl.
CPC ........... *H01R 12/716* (2013.01); *H01R 12/57* (2013.01); *H01R 12/70* (2013.01); *H01R 12/707* (2013.01); *H01R 12/712* (2013.01); *H01R 13/405* (2013.01); *H01R 13/502* (2013.01); *H01R 13/516* (2013.01); *H01R 13/6594* (2013.01); *H01R 12/55* (2013.01);
(Continued)

(58) Field of Classification Search
CPC ...... H01R 12/716; H01R 12/57; H01R 12/70; H01R 12/707; H01R 12/712; H01R 13/405; H01R 13/502; H01R 13/516; H01R 13/6594; H01R 12/55; H01R 12/7011; H01R 12/714; H01R 12/73; H01R 13/40; H01R 13/504; H01R 13/518; H01R 13/648; H01R 13/658; H01R 13/6585
See application file for complete search history.

(56) References Cited

U.S. PATENT DOCUMENTS

2022/0239024 A1* 7/2022 Tsai ...................... H01R 43/24

FOREIGN PATENT DOCUMENTS

JP 2000277219 A 10/2000
JP 2000-311736 A 11/2000
(Continued)

OTHER PUBLICATIONS

Japanese Office Action dated Sep. 2, 2025 in corresponding Japanese Patent Application No. 2022-034067, with English Translation of relevant part.

*Primary Examiner* — Justin M Kratt
(74) *Attorney, Agent, or Firm* — Renner, Otto, Boisselle & Sklar, LLP

(57) ABSTRACT

A base includes a lower surface opposed to a lower board on which a receptacle is surface-mounted. The lower surface includes a solder connection part exposed toward the lower board without being covered with a housing so that it is soldered to a ground pattern of the lower board. This structure improves signal characteristics of a contact at low cost in a surface-mounting connector where the contact and the housing are integrated by insert molding. The signal characteristics of each conductive pattern are thereby improved at low cost.

5 Claims, 29 Drawing Sheets

(51) Int. Cl.

| | |
|---|---|
| ***H01R 12/70*** | (2011.01) |
| ***H01R 13/405*** | (2006.01) |
| ***H01R 13/502*** | (2006.01) |
| ***H01R 13/516*** | (2006.01) |
| ***H01R 13/6594*** | (2011.01) |
| *H01R 12/55* | (2011.01) |
| *H01R 12/73* | (2011.01) |
| *H01R 13/40* | (2006.01) |
| *H01R 13/504* | (2006.01) |
| *H01R 13/518* | (2006.01) |
| *H01R 13/648* | (2006.01) |
| *H01R 13/658* | (2011.01) |
| *H01R 13/6585* | (2011.01) |

(52) U.S. Cl.

CPC ........ *H01R 12/7011* (2013.01); *H01R 12/714* (2013.01); *H01R 12/73* (2013.01); *H01R 13/40* (2013.01); *H01R 13/504* (2013.01); *H01R 13/518* (2013.01); *H01R 13/648* (2013.01); *H01R 13/658* (2013.01); *H01R 13/6585* (2013.01)

(56) References Cited

FOREIGN PATENT DOCUMENTS

| | | | |
|---|---|---|---|
| JP | 2005243403 | A | 9/2005 |
| WO | WO-2022070860 | A1 * | 4/2022 |

* cited by examiner

ELECTRICAL CONNECTOR WITH CONTACT ASSEMBLY INTEGRALLY FORMED WITH HOUSING BY INSERT MOLDING

INCORPORATION BY REFERENCE

This application is based upon and claims the benefit of priority from Japanese patent application No. 2022-034067, filed on Mar. 7, 2022, the disclosure of which is incorporated herein in its entirety by reference.

BACKGROUND

The present disclosure relates to a connector.

As shown in FIG. 29 of the present application, Patent Literature 1 (Japanese Unexamined Patent Application Publication No. 2000-311736) discloses a surface-mounting receptacle connector 1003 in which a plurality of receptacle contacts 1001, each covered with a shield member 1000, is integrated with a receptacle connector body 1002 by insert molding. Each shield member 1000 includes an insulating layer such as ceramic or plastic deposited or coated on the periphery of a corresponding receptacle contact 1001, and a conductive layer such as metal or nickel plated on the periphery of this insulating layer. When the receptacle connector 1003 is surface-mounted on a board, the conductive layer of each shield member 1000 is soldered to a corresponding ground pattern of the board.

SUMMARY

In the structure disclosed in Patent Literature 1, it is necessary to form the shield member 1000 on the periphery of each receptacle contact 1001, which leads to a complicated structure and high manufacturing cost.

One of the objects of the present disclosure is to provide a technique to improve signal characteristics of a contact at low cost in a surface-mounting connector where the contact and a housing are integrated by insert molding According to an aspect of the present disclosure, there is provided a connector including a housing made of insulating resin, and a contact assembly integrally formed with the housing by insert molding, wherein the contact assembly includes a base made of metal including a fixed part in a flat-plate shape fixed to the housing and a projecting part projecting from the fixed part at least in a thickness direction of the fixed part, an insulating layer covering the base, and a conductive pattern formed on the insulating layer, extending from the fixed part to the projecting part, and functioning as a contact, the base includes an opposed-to board surface opposed to a board on which the connector is surface-mounted, and the opposed-to board surface includes a solder connection part exposed toward the board without being covered with the housing so as to be soldered to a ground pattern of the board.

According to the present disclosure, signal characteristics of a contact are improved at low cost in a surface-mounting connector where the contact and a housing are integrated by insert molding The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

A first embodiment of the present disclosure will be described hereinafter with reference to FIGS. 1 to 21.

Figure 1:
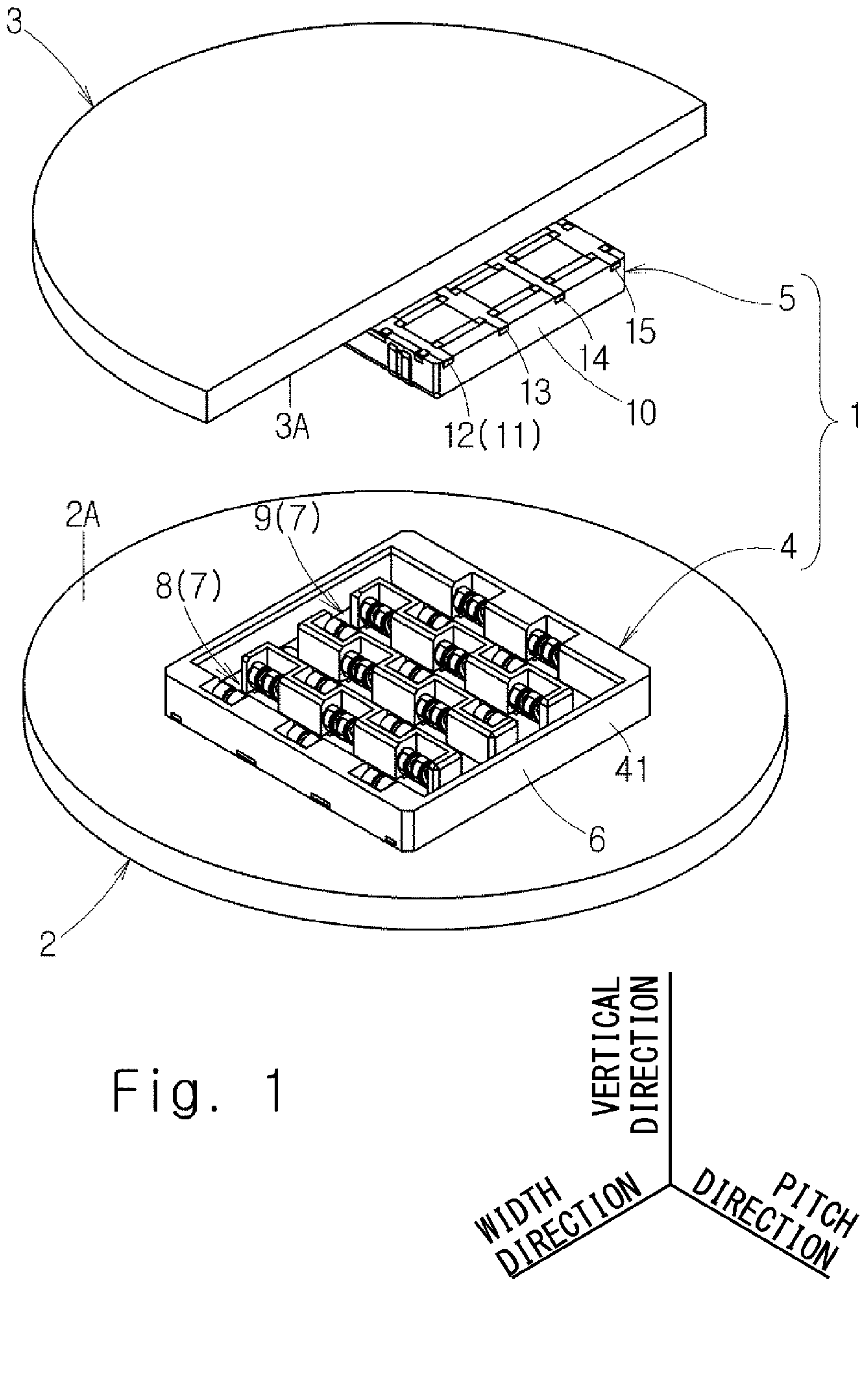
FIG. 1 is a perspective view of a connector assembly (first embodiment)
Figure 2:
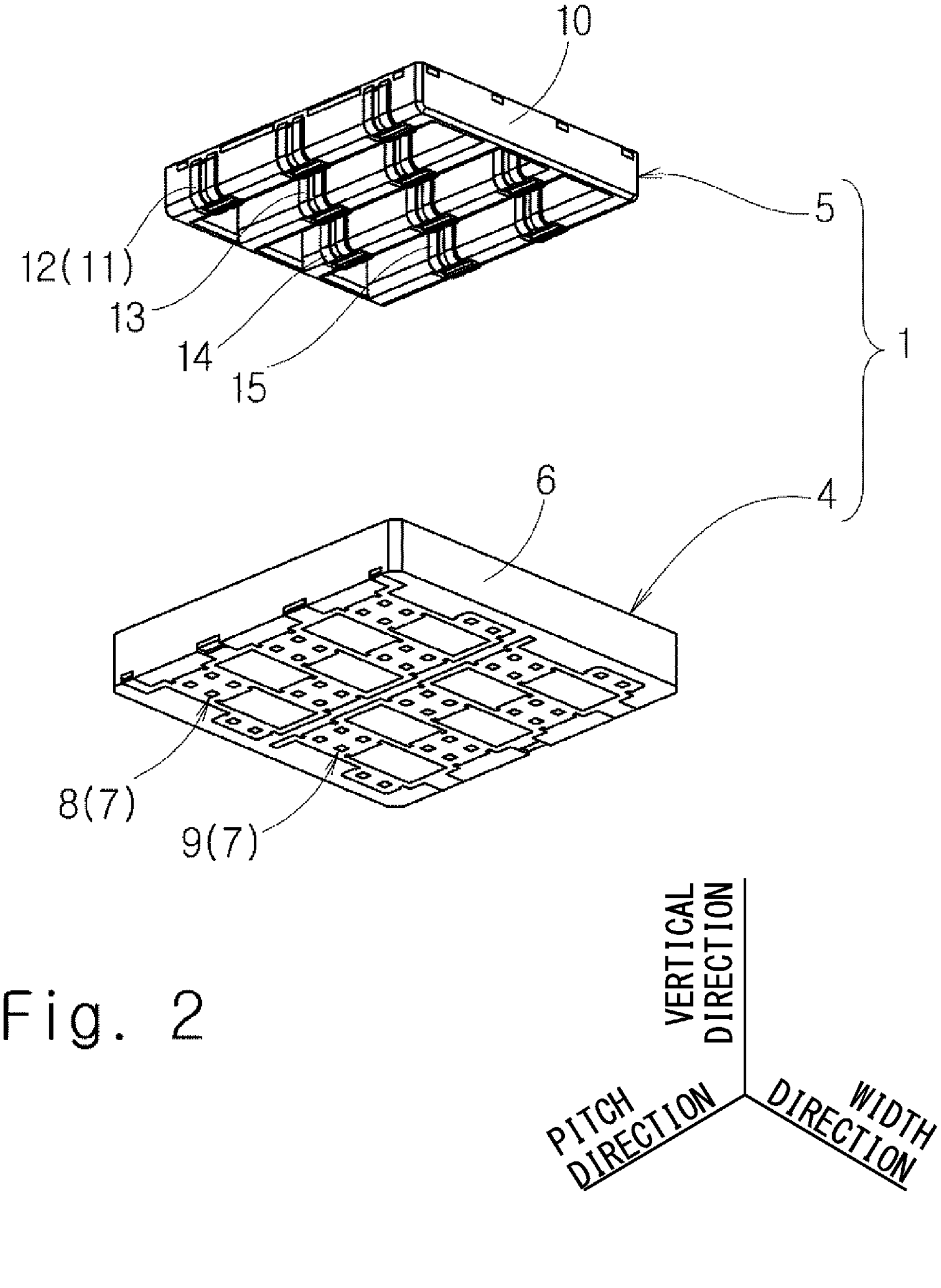
FIG. 2 is a perspective view of the connector assembly when viewed from another angle (first embodiment)

FIGS. 1 and 2 show a connector assembly 1. As shown in FIGS. 1 and 2, the connector assembly 1 mechanically and electrically connects a lower board 2 (receptacle side board, first board, board) and an upper board 3 (plug side board, second board, board). The connector assembly 1 includes a receptacle 4 (connector) that is surface-mounted on a connector mounting surface 2A of the lower board 2 and a plug 5 (connector) that is surface-mounted on a connector mounting surface 3A of the upper board 3. The connector assembly 1 according to this embodiment is a fine pitch and low profile surface-mounting connector assembly where the number of cores is forty.

The lower board 2 and the upper board 3 may be a rigid board such as a paper phenolic board or a glass epoxy board, or a flexible board, for example. In the state where the plug 5 is mated with the receptacle 4, the upper board 3 is parallel to the lower board 2.

The receptacle 4 includes a housing 6 made of insulating resin and a plurality of receptacle contact assemblies 7 integrally formed with the housing 6 by insert molding. In this embodiment, the plurality of receptacle contact assemblies 7 include a first receptacle contact assembly 8 and a second receptacle contact assembly 9. Note that, however, the number of receptacle contact assemblies 7 that constitute the receptacle 4 is not limited thereto, and it may be only one or may be three or more. The first receptacle contact assembly 8 and the second receptacle contact assembly 9 have substantially the same shape.

The plug 5 includes a housing 10 made of insulating resin and a plurality of plug contact assemblies 11 integrally formed with the housing 10 by insert molding. In this embodiment, the plurality of plug contact assemblies 11 include a first plug contact assembly 12, a second plug contact assembly 13, a third plug contact assembly 14, and a fourth plug contact assembly 15. Note that, however, the number of plug contact assemblies 11 that constitute the plug 5 is not limited thereto, and it may be one, two, three, or five or more.

Figure 3:
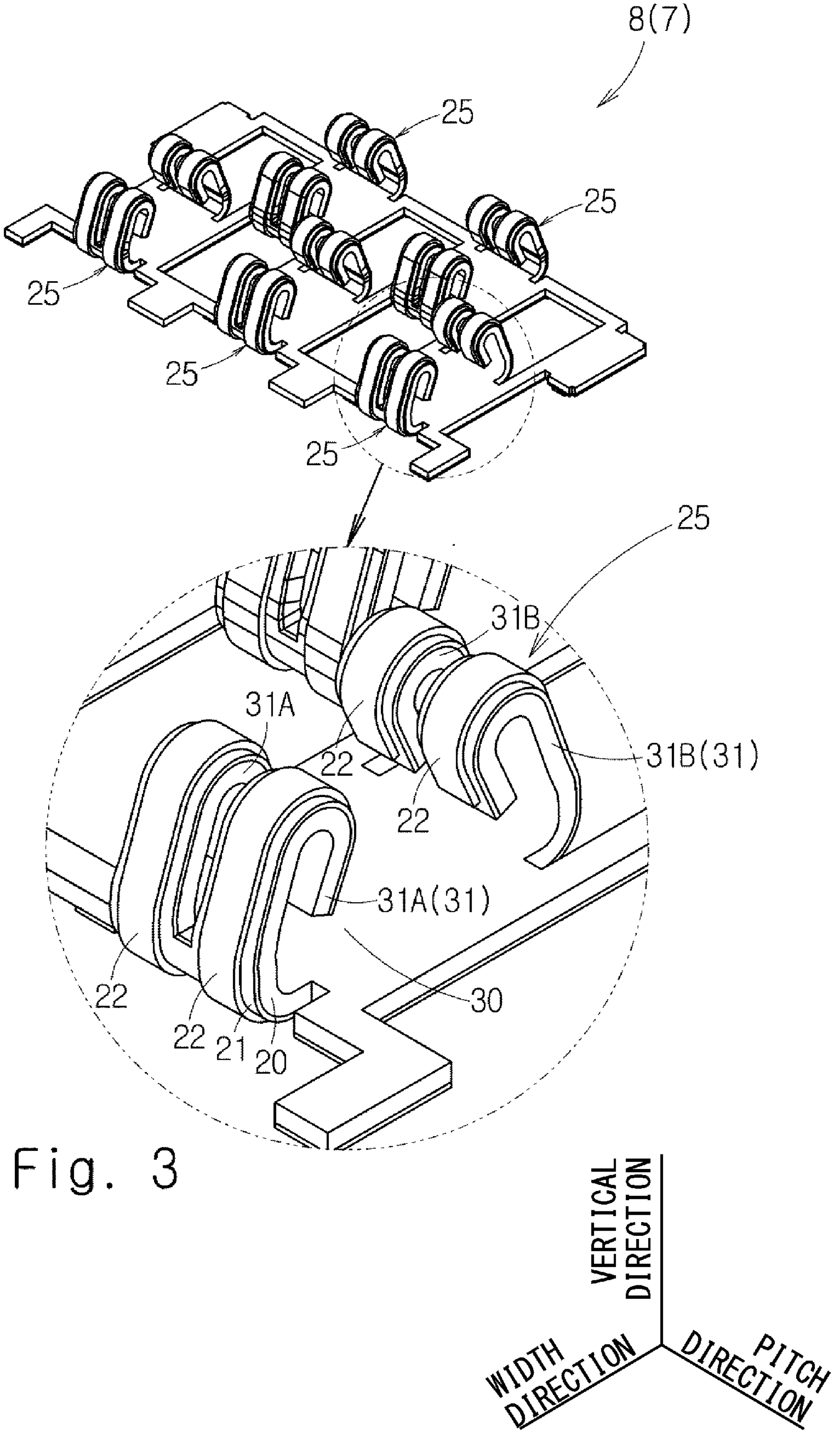
FIG. 3 is a perspective view of a receptacle contact assembly (first embodiment)
Figure 4:
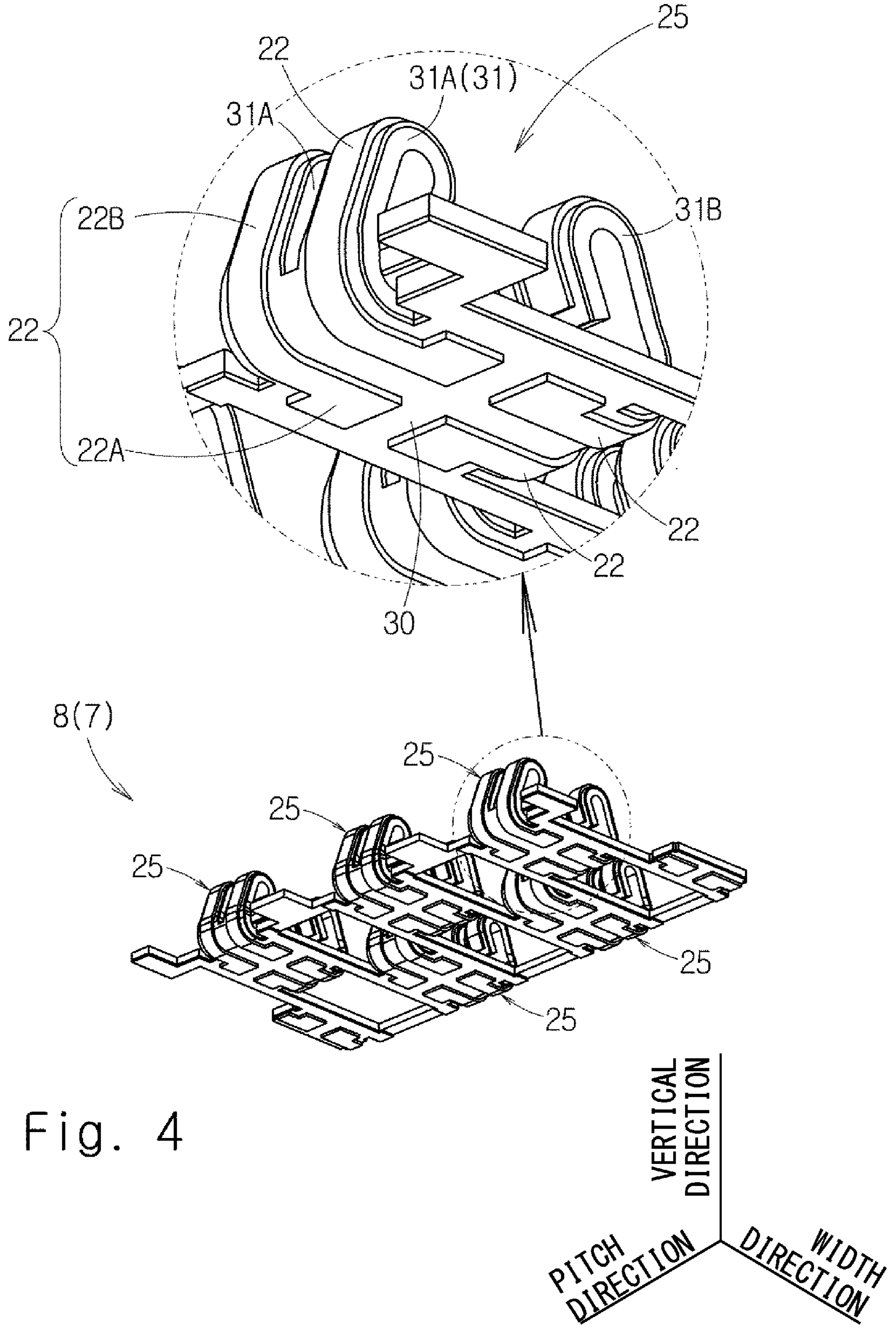
FIG. 4 is a perspective view of the receptacle contact assembly when viewed from another angle (first embodiment)
Figure 5:
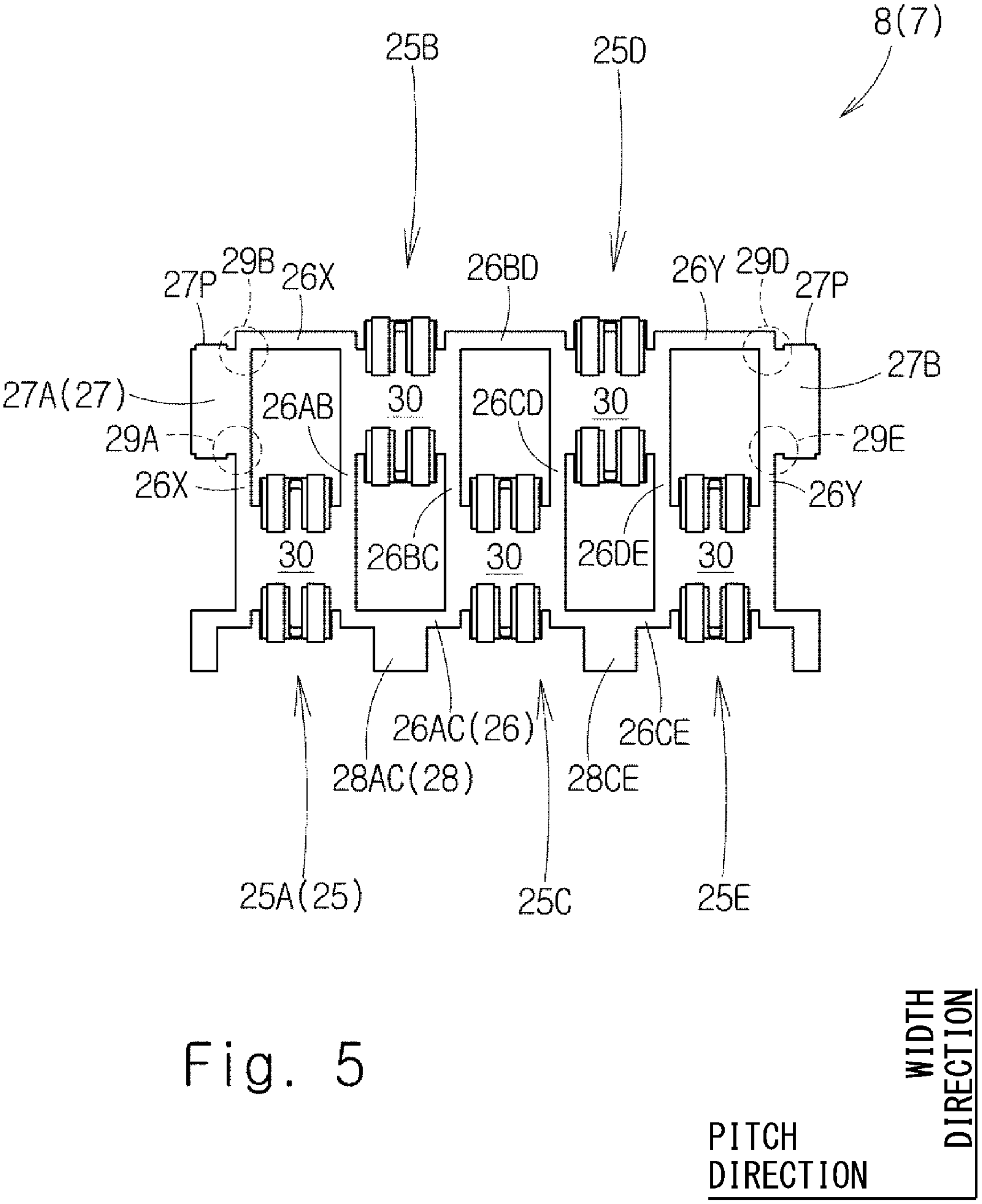
FIG. 5 is a plan view of the receptacle contact assembly (first embodiment)
Figure 6:
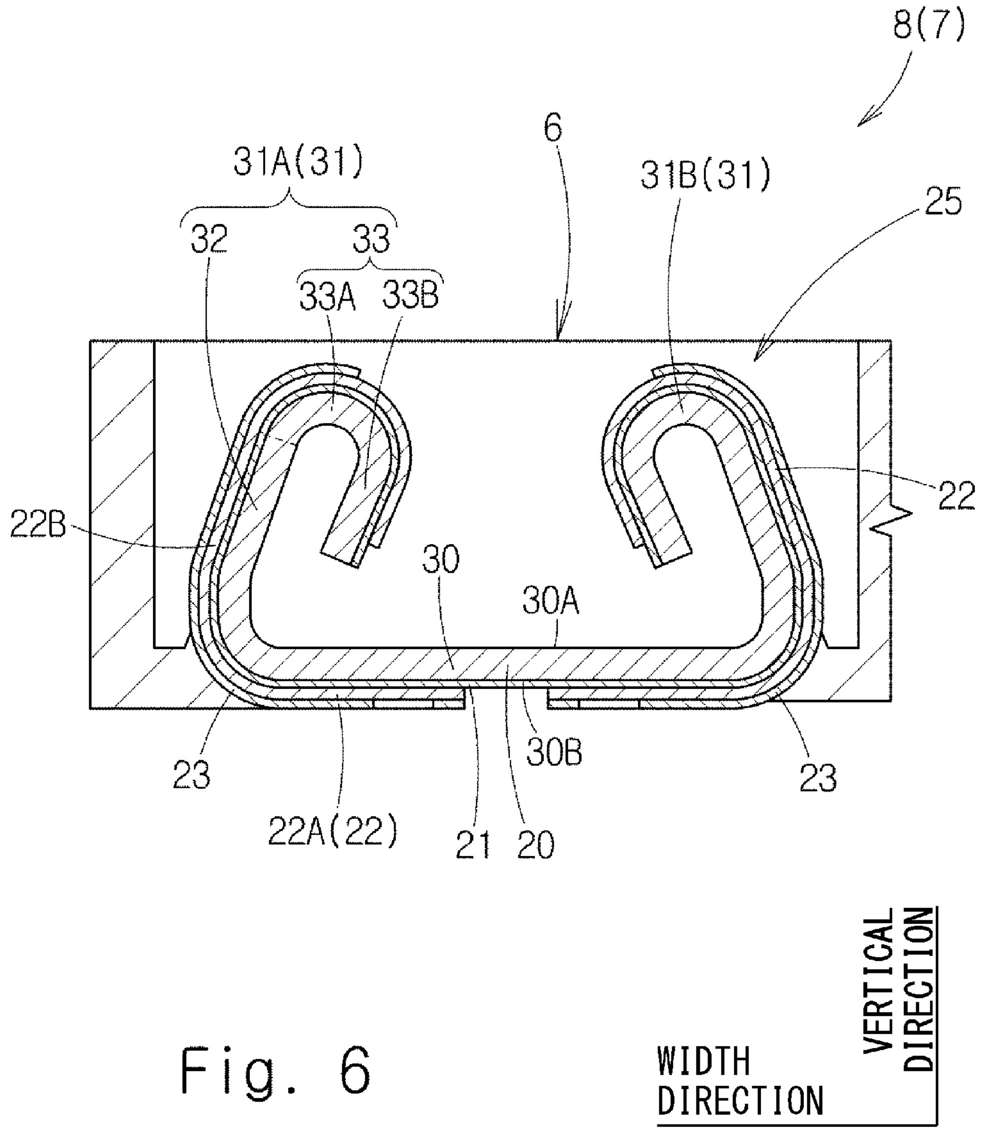
FIG. 6 is a cross-sectional view of a contact unit (first embodiment)

The first receptacle contact assembly 8 is described in detail hereinafter with reference to FIGS. 3 to 6. FIGS. 3 and 4 are perspective views of the first receptacle contact assembly 8. FIG. 5 is a plan view of the first receptacle contact assembly 8. FIG. 6 is a cross-sectional view of the first receptacle contact assembly 8.

As shown in FIGS. 3 to 6, the first receptacle contact assembly 8 has a trilaminar structure including a base 20, an insulating layer 21, and a plurality of conductive patterns 22.

The base 20 is formed by punching and bending a conductive metal plate such as stainless, for example. In this embodiment, the base 20 is not plated. Note that, however, the base 20 may be plated with a conductive metal such as nickel, zinc, gold and copper, for example. In other words, plating is optional. Thus, in this specification, the base 20 can be a metal plate in some cases, and the base 20 can be a combination of a metal plate and a plated layer in other cases. Since plating is optional, no discrimination is made between them. For example, the sentence "the base 20 is exposed" can be interpreted in two ways: "the base 20 itself is exposed" and "a layer of plating applied to the base 20 is exposed".

The insulating layer 21 is typically polyimide or aramid, and it is placed on top of the lower board 2 so as to cover the base 20 from the lower board 2 side.

The plurality of conductive patterns 22 are typically copper or copper alloy, and they are formed on the insulating layer 21.

Referring next to FIG. 5, the structure of the first receptacle contact assembly 8 is illustrated in a plan view. As shown in FIG. 5, the first receptacle contact assembly 8 includes a plurality of contact units 25, a plurality of coupling beams 26, a plurality of supporting parts 27, and a plurality of carrier coupling parts 28.

In this embodiment, the plurality of contact units 25 include five contact units 25. The five contact units 25 include a contact unit 25A, a contact unit 25B, a contact unit 25C, a contact unit 25D, and a contact unit 25E. The contact unit 25A, the contact unit 25B, the contact unit 25C, the contact unit 25D, and the contact unit 25E are arranged in this recited order in the longitudinal direction of the first receptacle contact assembly 8.

A pitch direction, a width direction, and a vertical direction are defined as below. The pitch direction, the width direction, and the vertical direction are orthogonal to each other. As shown in FIG. 5, the pitch direction is the longitudinal direction of the first receptacle contact assembly 8. Referring to FIGS. 1 and 2, the vertical direction is orthogonal to the connector mounting surface 2A of the lower board 2. The vertical direction includes an upward direction and a downward direction. The upward direction is the direction in which the plug 5 moves relative to the receptacle 4 when removing the plug 5 from the receptacle 4. The downward direction is the direction in which the plug 5 moves relative to the receptacle 4 when mating the plug 5 with the receptacle 4. Thus, the vertical direction is the insertion and removal direction of the plug 5 to and from the receptacle 4. As described above, the width direction is orthogonal to the pitch direction and the vertical direction. The above-described vertical direction is a direction defined by way of illustration only and should not be interpreted as limiting the position of the connector assembly 1 when actually used.

Referring back to FIG. 5, the contact unit 25A, the contact unit 25B, the contact unit 25C, the contact unit 25D, and the contact unit 25E are arranged in this recited order in the pitch direction. In this embodiment, the five contact units 25 are arranged in a staggered manner in the pitch direction. Thus, the contact unit 25A and the contact unit 25C are opposed to each other in the pitch direction, the contact unit 25B and the contact unit 25D are opposed to each other in the pitch direction, and the contact unit 25C and the contact unit 25E are opposed to each other in the pitch direction.

As shown in FIG. 3, the base 20 of each contact unit 25 includes one fixed part 30 and a plurality of projecting parts 31. In this embodiment, the plurality of projecting parts 31 include four projecting parts 31.

FIG. 6 is a cross-sectional view of each contact unit 25. As shown in FIG. 6, the fixed part 30 has a flat plate shape. The thickness direction of the fixed part 30 coincides with the vertical direction. The fixed part 30 includes an upper surface 30A facing upward a lower surface 30B facing downward. The fixed part is fixed to the housing 6. To be specific, the fixed part 30 is fixed to the housing 6 in such a way that it is not elastically deformable. The fixed part 30 is fixed to the housing 6 in such a way that it is not relatively displaceable. Note that, however, the upper surface 30A and the lower surface 30B of the fixed part are not covered with the housing 6.

Referring back to FIG. 3, the four projecting parts 31 project substantially upward from the fixed part 30. The four projecting parts 31 project, two by two, from the both ends in the width direction of the fixed part 30. First projecting parts 31A as two projecting parts 31 that project from one end in the width direction of the fixed part 30 and second projecting parts 31B as two projecting parts 31 that project from the other end thereof are opposed to each other in the width direction. Specifically, one of the two first projecting parts 31A and one of the two second projecting parts 31B are opposed to each other in the width direction, and the other one of the two first projecting parts 31A and the other one of the two second projecting parts 31B are opposed to each other in the width direction in the same manner.

Referring again to FIG. 6, the shape of the first projecting part 31A and the second projecting part 31B is described in detail hereinafter. Since the first projecting part 31A and the second projecting part 31B have symmetrical shapes, the shape of the first projecting part 31A is described below, and the description of the shape of the second projecting part 31B is omitted. The first projecting part 31A is a cantilever arm supported by the fixed part 30, and it includes an extension part 32 and a contact part 33. In FIG. 6, the boundary between the extension part 32 and the contact part 33 is shown by a dashed line for better understanding.

The extension part 32 elastically supports the contact part 33 so that the contact part 33 is elastically displaceable in the width direction. The extension part 32 extends to be inclined upward from the fixed part 30 so as to come closer to the second projecting part 31B.

The contact part 33 is a part that comes into contact with a contact (opponent contact) of the plug 5. The contact part 33 includes a curve part 33A that curves to be convex upward from the upper end of the extension part 32 to come closer to the second projecting part 31B and a removal guide part 33B that extends to be inclined downward from the distal end of the curve part 33A so as to separate from the second projecting part 31B.

In the above structure, the first projecting part 31A is not fixed elastically undeformable by the housing 6, and it is elastically deformable without being covered with the housing 6. In other words, the first projecting part 31A is supported like a cantilever beam by the housing 6 in such a way that it is elastically deformable. The contact part 33 is supported by the fixed part 30 through the extension part 32, so that it is displaceable in the width direction as the extension part 32 is elastically deformed.

Referring back to FIG. 3, each contact unit 25 includes four conductive patterns 22. The four conductive patterns 22 are formed in one-to-one correspondence with the four projecting parts 31. The two conductive patterns 22 that are formed respectively in the two projecting parts 31 adjacent to each other in the pitch direction are suitable for differential transmission, for example.

As shown in FIG. 6, each conductive pattern 22 is formed on the insulating layer 21 and thereby functions as a contact. Each conductive pattern 22 extends from the lower surface 30B of the fixed part 30 to the removal guide part 33B of the contact part 33 of the projecting part 31. Each conductive pattern 22 includes a first pattern part 22A that is opposed to the lower surface 30B of the fixed part with the insulating layer 21 interposed therebetween and a second pattern part 22B that is opposed to the projecting part 31 with the insulating layer 21 interposed therebetween.

In this embodiment, each conductive pattern 22 is mostly covered with a resist 23 except for a part thereof. Specifically, the resist 23 is placed on the opposite side of the insulating layer 21 with each conductive pattern 22 interposed therebetween. The resist 23 primarily prevents unintended electrical contact of each conductive pattern 22 with the lower board 2 or the plug 5, for example. The resist 23 does not cover a part of the first pattern part 22A of each conductive pattern 22. Thus, the first pattern part 22A of each conductive pattern 22 can be soldered to an electrode pad of the lower board 2. Further, the resist 23 does not cover a part of the second pattern part 22B of each conductive pattern 22 that is opposed to the contact part 33. Thus, the resist 23 does not inhibit electrical contact between the second pattern part 22B of each conductive pattern 22 and the contact on the plug 5 side.

As shown in FIG. 6, the conductive pattern 22 corresponding to the first projecting part 31A and the conductive pattern 22 corresponding to the second projecting part 31B are electrically independent and isolated from each other. Thus, the two conductive patterns 22 formed in each of the first projecting part 31A and the second projecting part 31B opposed to each other in the width direction function as two contacts capable of transmitting different electrical signals from each other.

Referring back to FIG. 5, the plurality of coupling beams 26 are formed using the base 20. Although whether the base 20 that forms each coupling beam 26 is covered with the insulating layer 21 is optional, the base 20 that forms each coupling beam 26 may be covered with the insulating layer 21 in order to prevent unintended electrical contact.

In this embodiment, the plurality of coupling beams 26 include eleven coupling beams 26. The eleven coupling beams 26 include a coupling beam 26AB, a coupling beam 26BC, a coupling beam 26CD, a coupling beam 26DE, a coupling beam 26AC, a coupling beam 26CE, a coupling beam 26BD, two coupling beams 26X, and two coupling beams 26Y.

The coupling beam 26AB, the coupling beam 26BC, the coupling beam 26CD, the coupling beam 26DE, the coupling beam 26AC, the coupling beam 26CE, and the coupling beam 26BD couple the fixed parts 30 of the plurality of contact units 25 with one another. The fixed parts 30 of the plurality of contact units 25 thereby link together in an unbroken manner in the pitch direction.

To be specific, the coupling beam 26AB (first coupling beam) couples the fixed part 30 of the contact unit 25A (first contact unit) and the fixed part 30 of the contact unit 25B (second contact unit). The coupling beam 26BC couples the fixed part 30 of the contact unit 25B and the fixed part 30 of the contact unit 25C. The coupling beam 26CD couples the fixed part 30 of the contact unit 25C and the fixed part 30 of the contact unit 25D. The coupling beam 26DE couples the fixed part 30 of the contact unit 25D and the fixed part 30 of the contact unit 25E. The coupling beam 26AC (second coupling beam) couples the fixed part 30 of the contact unit 25A (first contact unit) and the fixed part 30 of the contact unit 25C (third contact unit). The coupling beam 26CE couples the fixed part 30 of the contact unit 25C and the fixed part 30 of the contact unit 25E. The coupling beam 26BD couples the fixed part 30 of the contact unit 25B and the fixed part 30 of the contact unit 25D.

Figure 7:
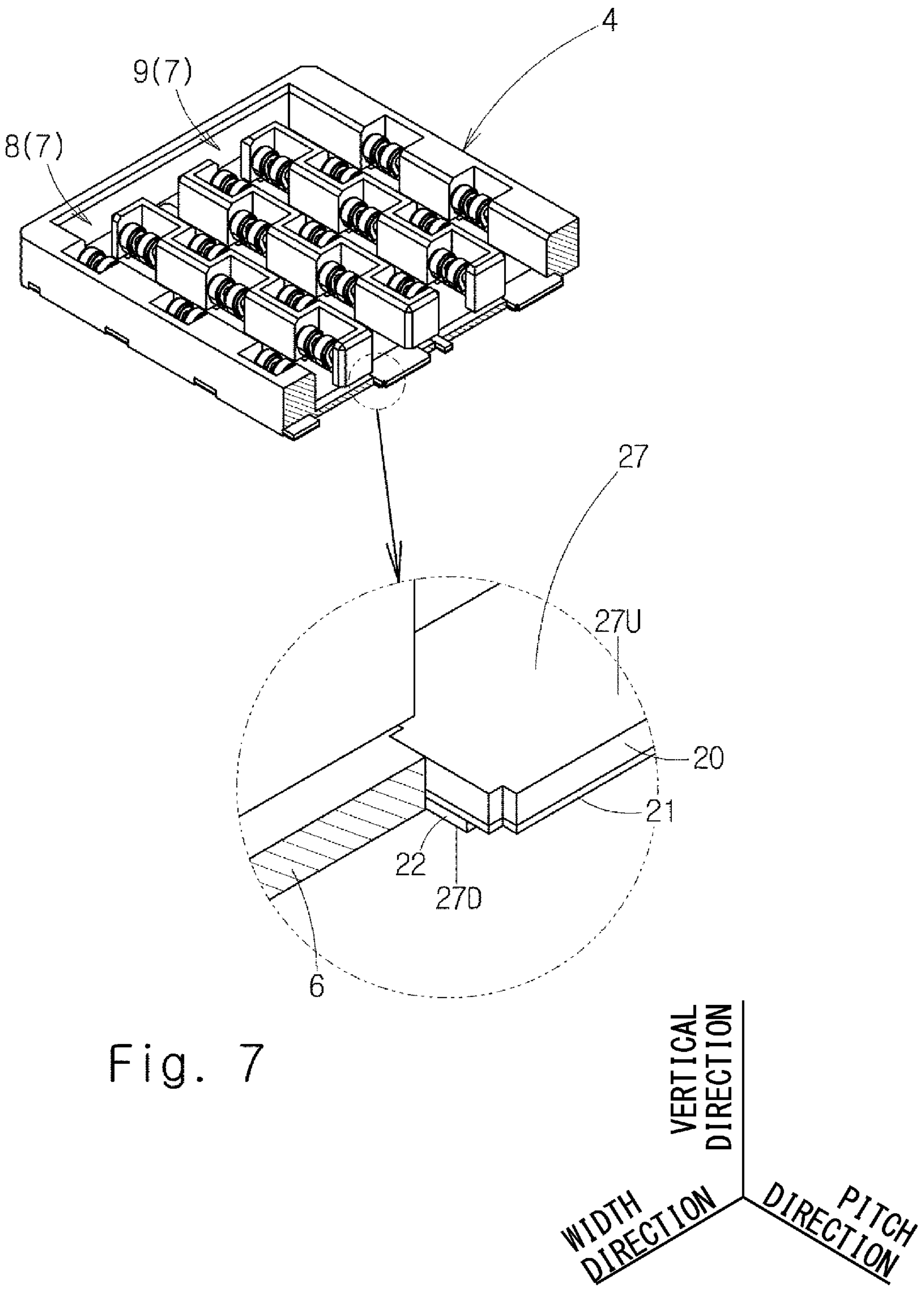
FIG. 7 is a partially cutout perspective view of a receptacle connector (first embodiment)

In this embodiment, the plurality of supporting parts 27 include two supporting parts 27. The two supporting parts 27 include a first supporting part 27A and a second supporting part 27B. The first supporting part 27A and the second supporting part 27B have a flat plate shape, and they are disposed with the plurality of contact units 25 interposed therebetween in the pitch direction. The first supporting part 27A is opposed to the contact unit 25B in the pitch direction. The second supporting part 27B is opposed to the contact unit 25D in the pitch direction. As shown in FIG. 7, the two supporting parts 27 have a flat plate shape. The thickness direction of each supporting part 27 coincides with the vertical direction. Each of the two supporting parts 27 have a trilaminar structure including the base 20, the insulating layer 21 and the conductive pattern 22, just like each contact unit 25. Each supporting part 27 is fixed to the housing 6. To be specific, each supporting part 27 is fixed to the housing 6 in such a way that it is not elastically deformable. Each supporting part 27 is fixed to the housing 6 in such a way that it is not displaceable relative to the housing 6. Each supporting part 27 is not covered with the housing 6 in the vertical direction. In other words, an upper surface 27U and a lower surface 27D of each supporting part 27 are not covered with the housing 6.

As shown in FIG. 5, a peripheral surface 27P of the base 20 of the first supporting part 27A is a sectional surface orthogonal to the thickness direction of the base 20 of the first supporting part 27A except for a connection part 29A with the fixed part 30 of the contact unit 25A and a connection part 29B with the fixed part 30 of the contact unit 25B. In other words, the projecting part 31 is not formed in the base 20 of the first supporting part 27A, differently from the base 20 of the contact unit 25.

Likewise, a peripheral surface 27P of the base 20 of the second supporting part 27B is a sectional surface orthogonal to the thickness direction of the base 20 of the second supporting part 27B except for a connection part 29D with the fixed part 30 of the contact unit 25D and a connection part 29E with the fixed part 30 of the contact unit 25E. In other words, the projecting part 31 is not formed in the base 20 of the second supporting part 27B, differently from the base 20 of the contact unit 25.

The first supporting part 27A is coupled to the fixed part 30 of the contact unit 25A and the fixed part 30 of the contact unit 25B through the two coupling beams 26X. The first supporting part 27A may be coupled only to the fixed part of the contact unit 25A or may be coupled only to the fixed part 30 of the contact unit 25B.

Likewise, the second supporting part 27B is coupled to the fixed part 30 of the contact unit 25D and the fixed part 30 of the contact unit 25E through the two coupling beams 26Y. The second supporting part 27B may be coupled only to the fixed part 30 of the contact unit 25D or may be coupled only to the fixed part 30 of the contact unit 25E.

In this embodiment, the plurality of carrier coupling parts 28 include two carrier coupling parts 28. The two carrier coupling parts 28 include a first carrier coupling part 28AC and a second carrier coupling part 28CE. The two carrier coupling parts 28 are remaining in the housing 6 at the completion stage of a connector, and a carrier to be separated after insert molding is connected thereto. The first carrier coupling part 28AC projects in the width direction from the coupling beam 26AC. The second carrier coupling part 28CE projects in the width direction from the coupling beam 26CE.

Figure 8:
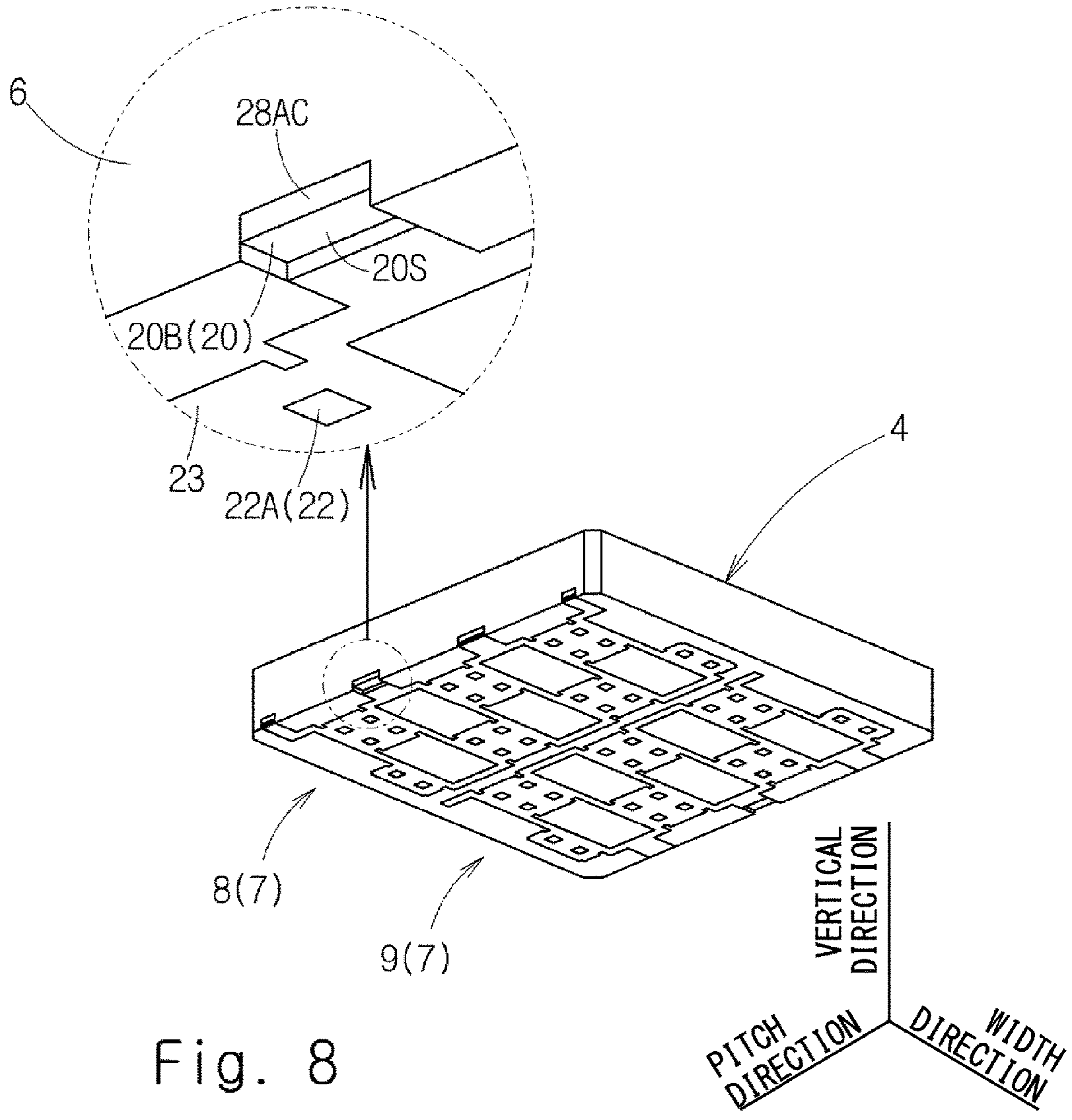
FIG. 8 is a perspective view of the receptacle connector (first embodiment)

As shown in FIG. 8, the first carrier coupling part 28AC has a monolayer structure that includes the base 20. A lower surface 20B (opposed-to board surface) of the base 20 of the first carrier coupling part 28AC is partially exposed toward the lower board 2 so that it can be soldered to a ground pattern of the lower board 2. Specifically, the lower surface 20B of the base 20 of the first carrier coupling part 28AC includes a solder connection part 20S that is exposed toward the lower board 2 so that it is soldered to a ground pattern of the lower board 2. The solder connection part 20S of the lower surface 20B of the base 20 of the first receptacle contact assembly 8 is then soldered to the ground pattern of the lower board 2, which allows the whole base 20 to function as a ground layer.

As shown in FIG. 6, the base 20 is opposed to each conductive pattern 22 with the insulating layer 21 interposed therebetween over the entire part of each conductive pattern 22 including the first pattern part 22A and the second pattern part 22B. This structure intentionally makes the base 20 function as a ground layer, which contributes to enhancing the transmission characteristics of each conductive pattern 22. To be specific, the impedance of each conductive pattern 22 is reduced compared with the case where there is no ground layer opposed to each conductive pattern 22. Further, crosstalk between the plurality of conductive patterns 22 is reduced. Further, the occurrence of noise superimposed on a signal transmitted by each conductive pattern 22 is also reduced. Furthermore, the transmission characteristics of each conductive pattern 22 are enhanced at a significantly lower cost compared with the case where each conductive pattern 22 is covered with a tubular ground layer. In addition, since the distance between each conductive pattern 22 and the base 20 as the ground layer does not vary regardless of elastic displacement of each projecting part 31 in the width direction, the impedance of each conductive pattern 22 does not increase or decrease, and thereby stable impedance of each conductive pattern 22 is achieved.

In this embodiment, the base 20 of the first receptacle contact assembly 8 is solderable to the ground pattern of the lower board 2 in the first carrier coupling part 28AC. Alternatively, the base 20 of the first receptacle contact assembly 8 may be solderable to the ground pattern of the lower board 2 in the second carrier coupling part 28CE. Further, it may be solderable to the ground pattern of the lower board 2 at any position of the first receptacle contact assembly 8.

Figure 9:
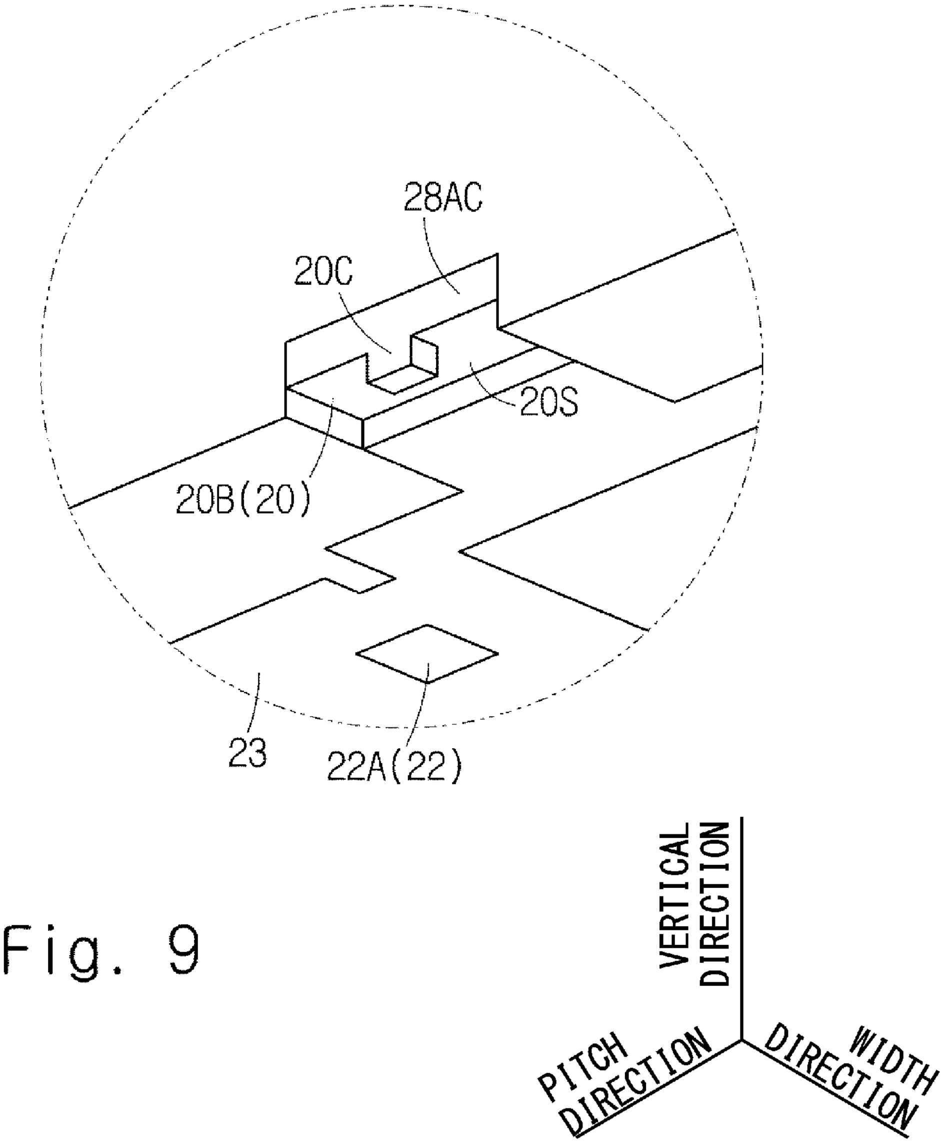
FIG. 9 is a perspective view of the receptacle connector (first embodiment)

Further, as shown in FIG. 9, a solder projecting part 20C that projects downward toward the lower board 2 may be formed in the solder connection part 20S of the lower surface 20B of the base 20 of the first carrier coupling part 28AC. As the solder projecting part 20C is formed in the solder connection part 20S, the gap between the solder connection part 20S and the connector mounting surface 2A of the lower board 2 is substantially narrowed, which allows the solder connection part 20S to be easily soldered to the ground pattern of the lower board 2.

Figure 10:
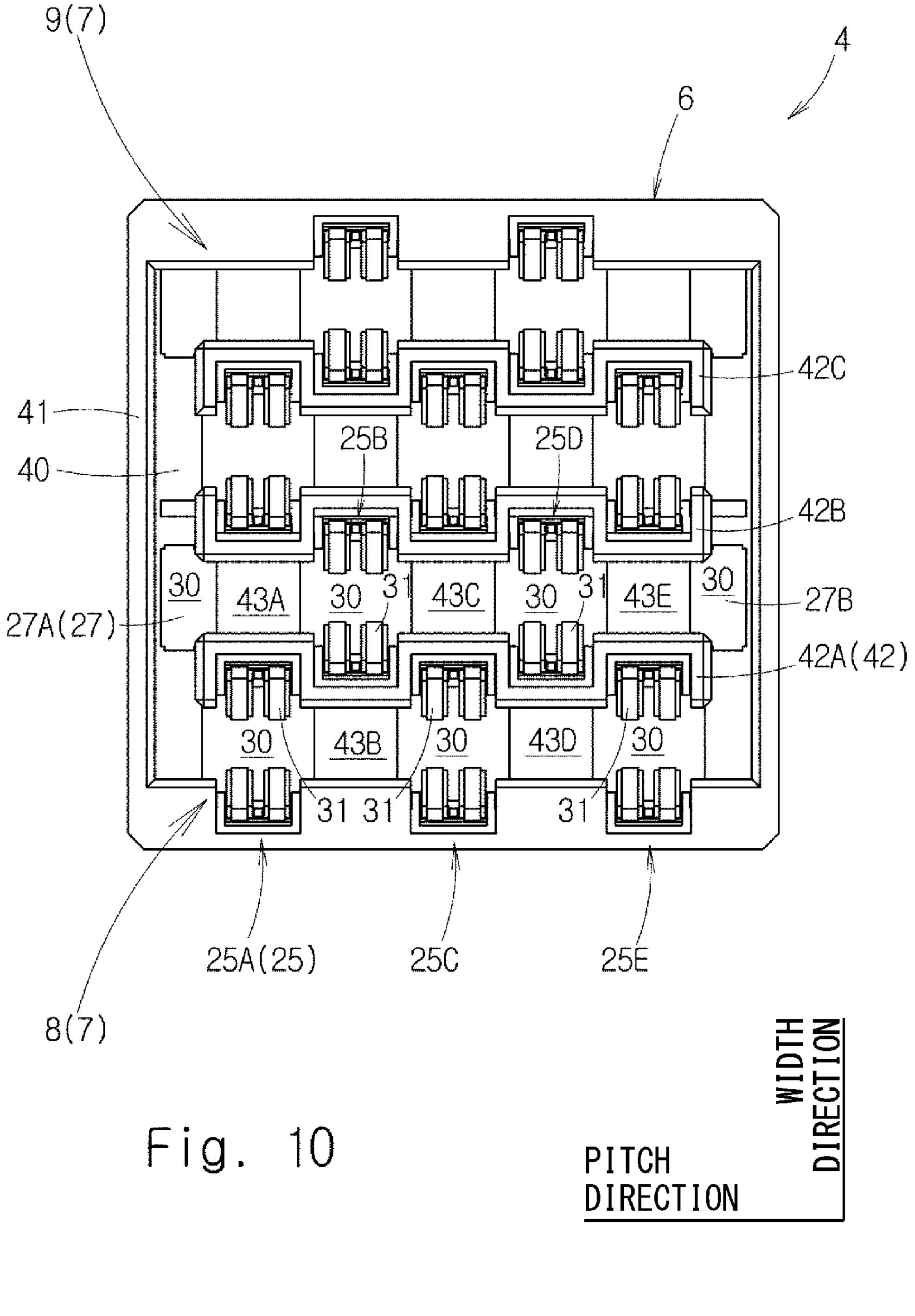
FIG. 10 is a plan view of the receptacle connector (first embodiment)

As shown in FIG. 10, the housing 6 includes a bottom part 40, a peripheral wall 41, and a plurality of dividing walls 42.

The bottom part 40 includes a plurality of filling parts 43. The plurality of filling parts 43 include a filling part 43A, a filling part 43B, a filling part 43C, a filling part 43D, and a filling part 43E, for example. The filling part 43A fills the gap between the fixed part 30 of the first supporting part 27A and the fixed part 30 of the contact unit 25B. The filling part 43B fills the gap between the fixed part of the contact unit 25A and the fixed part 30 of the contact unit 25C. The filling part 43C fills the gap between the fixed part 30 of the contact unit 25B and the fixed part 30 of the contact unit 25D. The filling part 43D fills the gap between the fixed part 30 of the contact unit 25C and the fixed part 30 of the contact unit 25E. The filling part 43E fills the gap between the fixed part 30 of the contact unit 25D and the fixed part 30 of the second supporting part 27B.

In this manner, a plurality of gaps of the first receptacle contact assembly 8 are respectively filled with the plurality of filling parts 43, which prevents solder from wicking up the conductive pattern 22 and wetting the second pattern part 22B when soldering the first pattern part 22A of the conductive pattern 22 shown in FIG. 4 to the lower board 2. In short, solder wicking in the first receptacle contact assembly 8 is prevented by integrating the first receptacle contact assembly 8 and the housing 6 by insert molding.

Referring back to FIG. 10, the peripheral wall 41 projects annularly upward from the bottom part 40 so as to surround the two receptacle contact assemblies 7. Thus, the first supporting part 27A and the second supporting part 27B are located inside the peripheral wall 41.

In this embodiment, the plurality of dividing walls 42 include three dividing walls 42. The three dividing walls 42 include a dividing wall 42A, a dividing wall 42B, and a dividing wall 42C. Each dividing wall 42 extends in a meandering manner in the pitch direction. The dividing wall 42A is disposed between the contact unit 25A and the contact unit 25C, and the contact unit 25B. Specifically, the dividing wall 42A divides the plurality of projecting parts 31 of the contact unit 25A and the plurality of projecting parts 31 of the contact unit 25C from the plurality of projecting parts 31 of the contact unit 25B. This prevents the plurality of conductive patterns 22 belonging to the contact unit 25B from coming into abnormal contact with any one of the conductive patterns 22 belonging the contact unit 25A or any one of the conductive patterns 22 belonging the contact unit 25C. The same applies to the dividing wall 42B and the dividing wall 42C.

Figure 11:
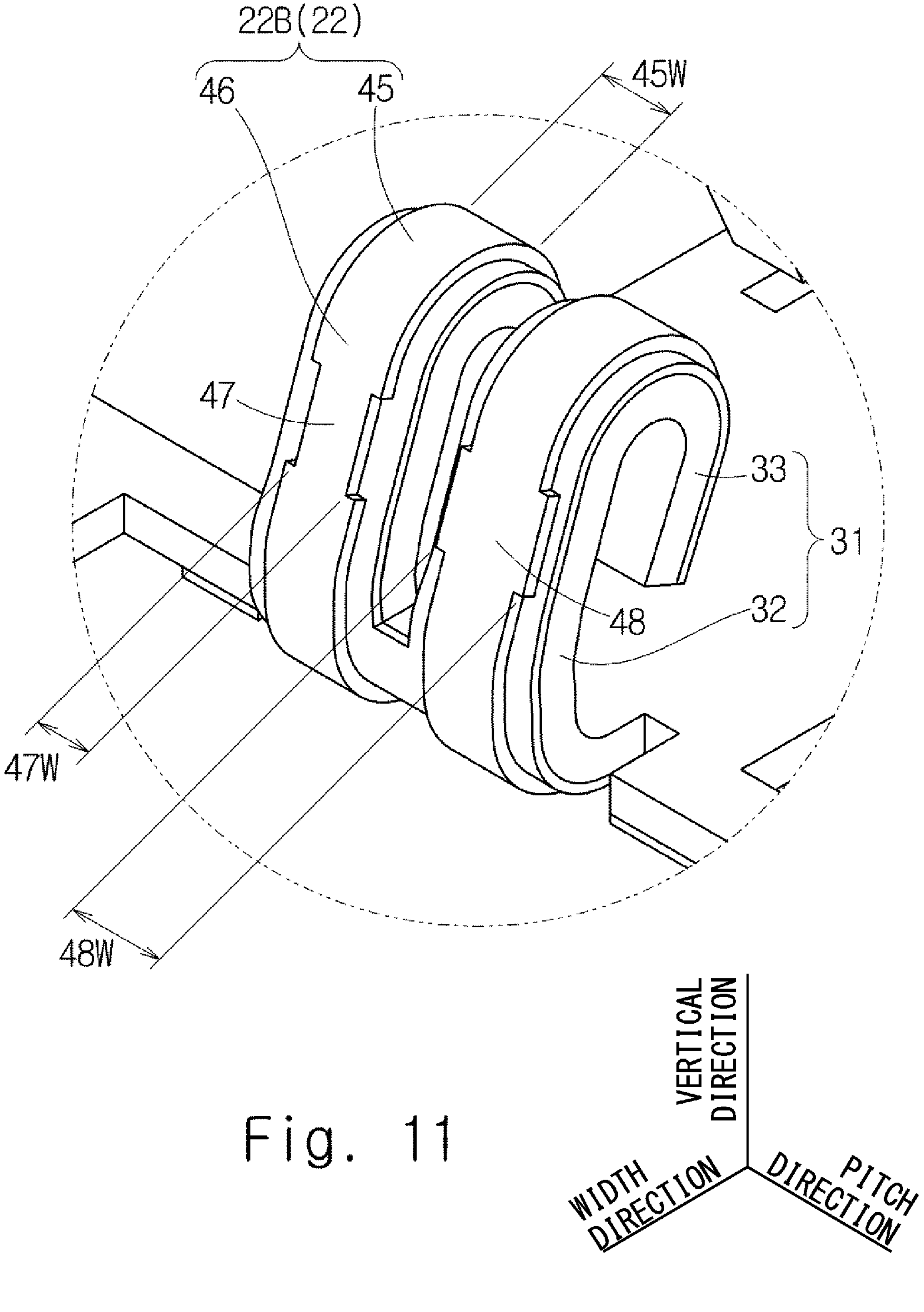
FIG. 11 is a partially enlarged perspective view of the receptacle contact assembly (first embodiment)
Figure 12:
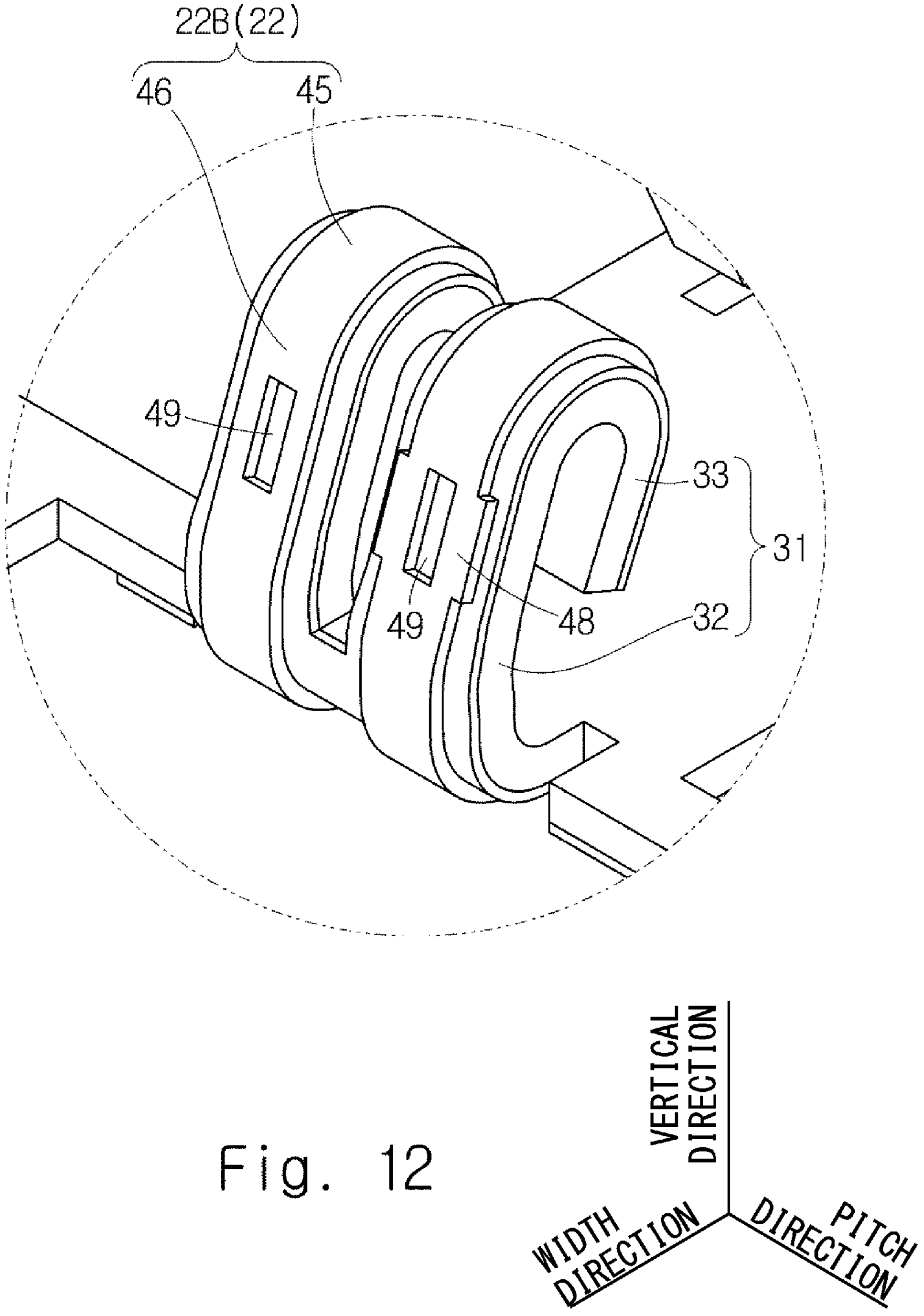
FIG. 12 is a partially enlarged perspective view of the receptacle contact assembly (first embodiment)

FIGS. 11 and 12 are perspective views of the conductive pattern 22. As shown in FIG. 11, the second pattern part 22B includes a contact pattern part 45 and an extension pattern part 46. The contact pattern part 45 is a part of the second pattern part 22B that is opposed to the contact part 33 of the projecting part 31 and comes into contact with a contact of the plug 5. The extension pattern part 46 is a part of the second pattern part 22B that is opposed to the extension part 32 of the projecting part 31.

As shown in FIG. 11, the extension pattern part 46 may include a narrow part 47 that is narrower than the contact pattern part 45. Specifically, a width 47W of the narrow part 47 is smaller than a width 45W of the contact pattern part 45. In this structure, the impedance of the conductive pattern 22 is higher compared with the case where the narrow part 47 is not formed and the width of the second pattern part 22B is uniform overall.

Further, as shown in FIG. 11, the extension pattern part 46 may include a wide part 48 that is wider than the contact pattern part 45. Specifically, a width 48W of the wide part 48 is greater than the width 45W of the contact pattern part 45. In this structure, the impedance of the conductive pattern 22 is lower compared with the case where the wide part 48 is not formed and the width of the second pattern part 22B is uniform overall.

As shown in FIG. 12, the extension pattern part 46 may have a slit 49 that extends in the longitudinal direction of the extension pattern part 46. Further, the extension pattern part 46 may include the wide part 48, and the wide part 48 may have the slit 49. This structure contributes to reducing the weight of the conductive pattern 22.

Figure 13:
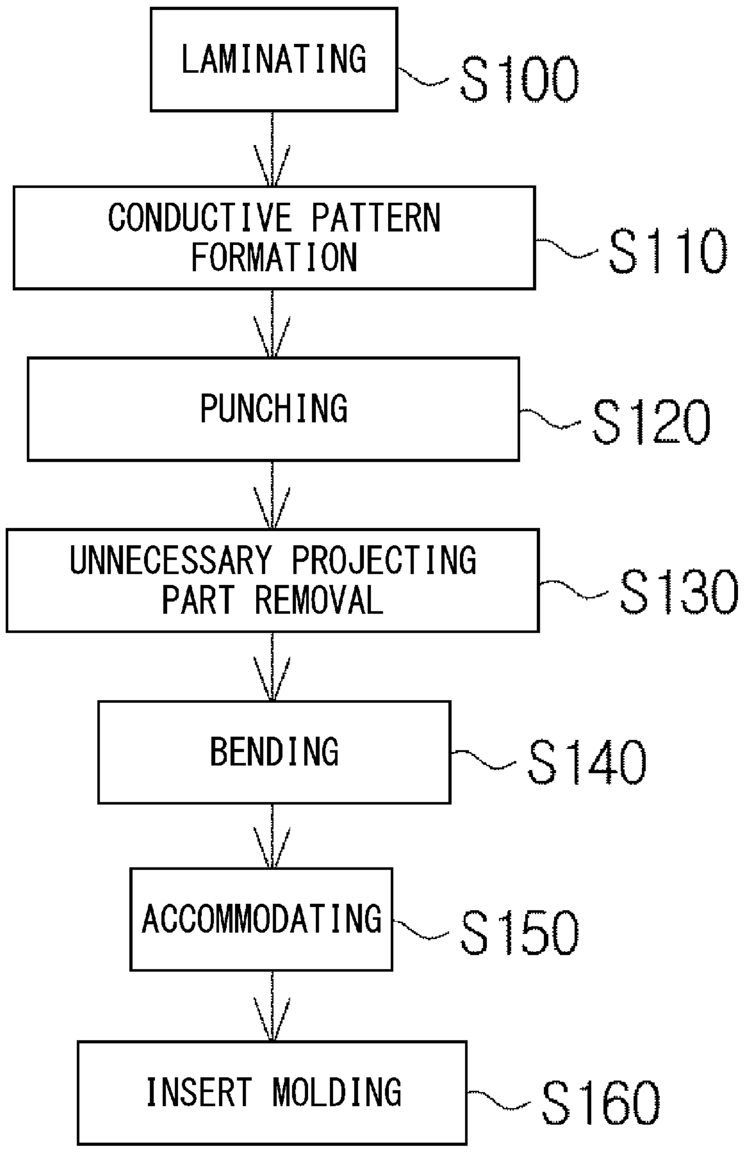
FIG. 13 is a manufacturing flow of the receptacle connector (first embodiment)

A method of manufacturing the receptacle 4 is described hereinafter with reference to FIGS. 13 to 19. FIG. 13 shows a manufacturing flow of the receptacle 4. As shown in FIG. 13, the manufacturing method of the receptacle 4 includes a laminating step (S100), a conductive pattern formation step (S110), a punching step (S120), an unnecessary projecting part removal step (S130), a bending step (S140), an accommodating step (S150), and an insert molding step (S160). In the manufacture of the receptacle 4, the two receptacle contact assemblies 7 are manufactured first, and then the housing 6 is formed by performing insert molding.

Laminating Step (S100):

In the laminating step, a hoop material made of stainless is prepared, and an insulating layer is laminated on one surface of the hoop material.

Figure 14:
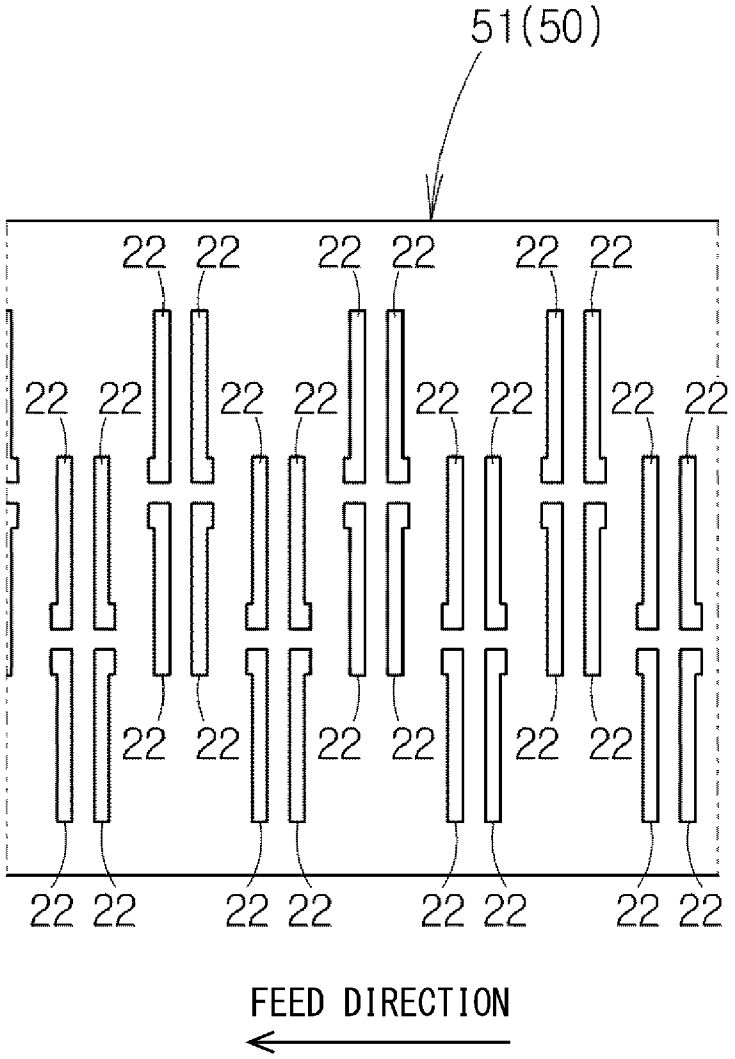
FIG. 14 is a plan view of a hoop material on which a plurality of conductive patterns are formed (first embodiment)

Conductive Pattern Formation Step (S110):

Next, as shown in FIG. 14, the plurality of conductive patterns 22 are formed as contacts on an insulating layer 51 laminated on a hoop material 50. Note that the chain double-dashed lines in FIG. 14 indicate that the hoop material 50 continues along the feed direction of the hoop material 50. The same applies to FIGS. 15 to 19.

Figure 15:
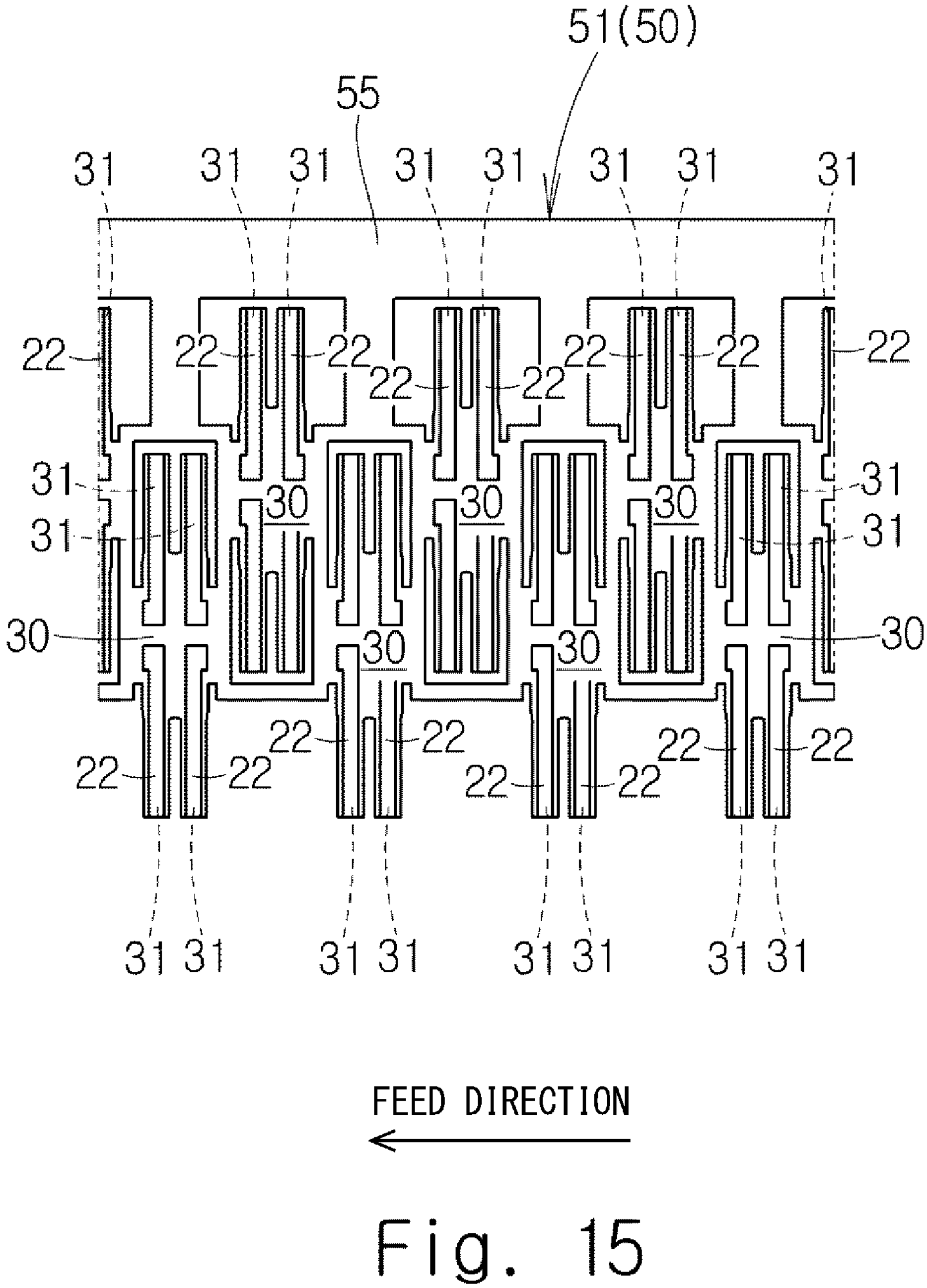
FIG. 15 is a plan view of the hoop material formed by punching (first embodiment)

Punching Step (S120):

Then, as shown in FIG. 15, the hoop material 50 is punched in such a way that the hoop material 50 includes the plurality of fixed parts 30 link together in an unbroken manner along the feed direction of the hoop material 50 and the four projecting parts 31 projecting from each of the fixed parts 30, and each conductive pattern 22 extends from each fixed part 30 to each projecting part 31. In this step, the hoop material 50 is punched so as to leave a carrier 55.

Figure 16:
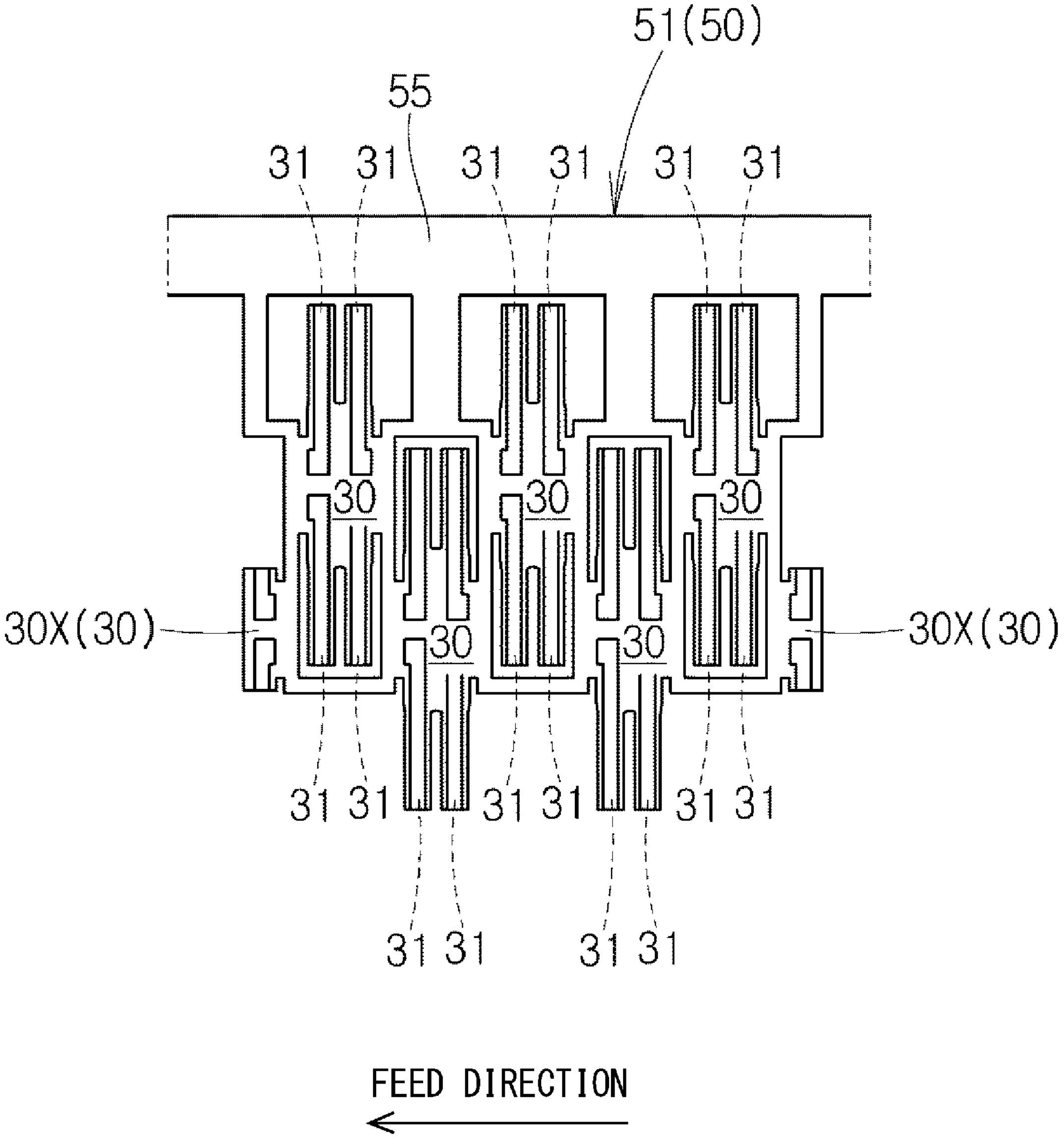
FIG. 16 is a plan view of the hoop material from which an unnecessary part is removed depending on the number of cores (first embodiment)

Unnecessary Projecting Part Removal Step (S130):

Then, as shown in FIG. 16, four projecting parts 31 projecting respectively from two fixed parts 30X corresponding to the front end and the back end in the feed direction of the hoop material 50 among the plurality of fixed parts 30 that are remaining in the housing 6 even at the completion stage of a connector are punched and removed. The two fixed parts 30X correspond to the two supporting parts 27 shown in FIG. 5. Note that the unnecessary projecting part removal step (S130) may be performed simultaneously with the punching step (S120).

Figure 17:
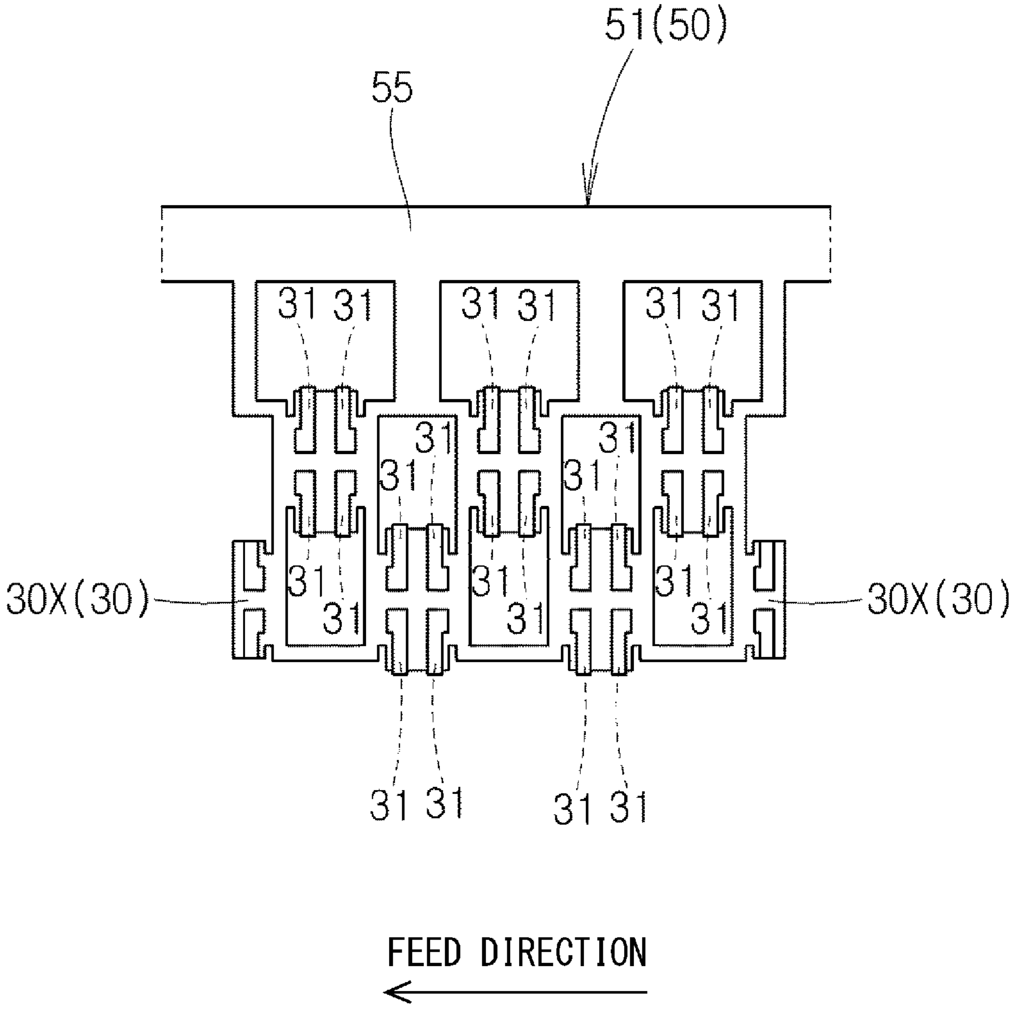
FIG. 17 is a plan view of the hoop material formed by bending (first embodiment)

Bending Step (S140):

Then, as shown in FIG. 17, the four projecting parts 31 projecting from each fixed part 30 are bent at least in the thickness direction of the fixed part 30. To be specific, the four projecting parts 31 projecting from each fixed part 30 are bent toward the back of the paper in FIG. 17.

Figure 18:
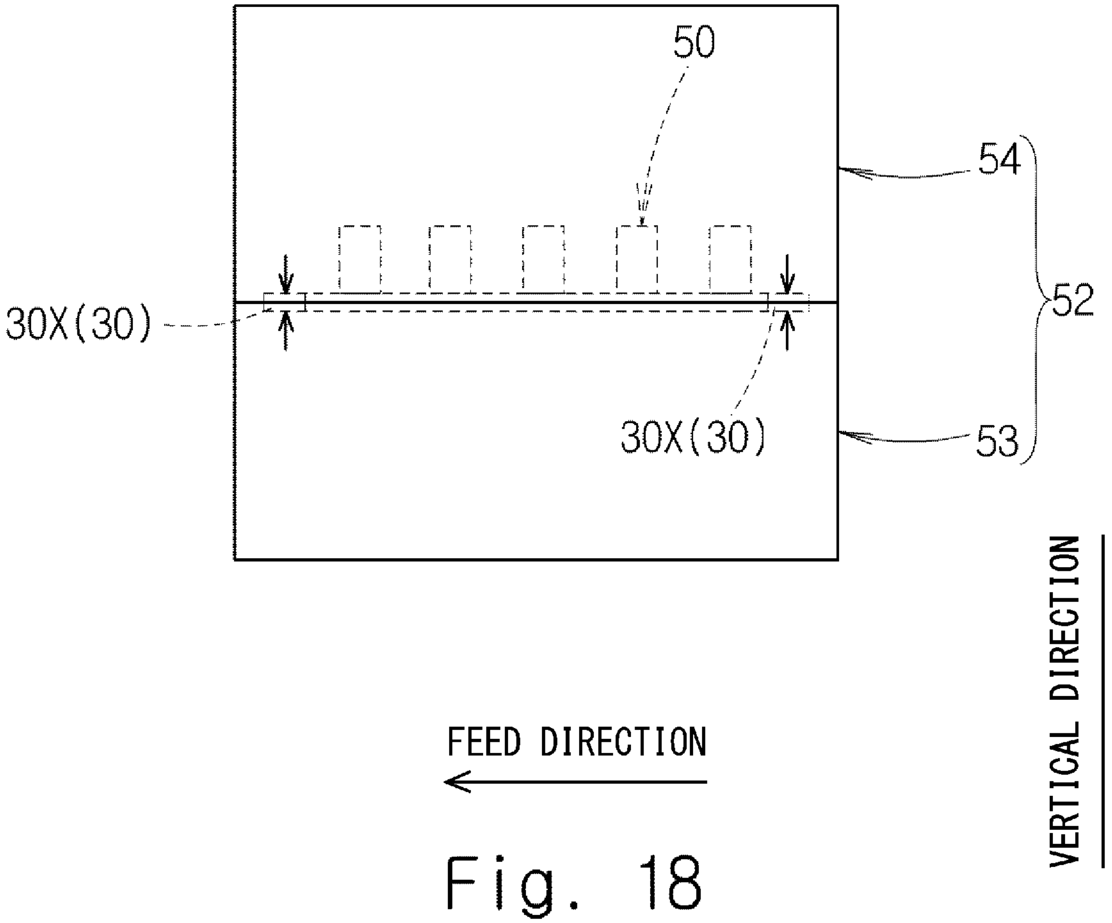
FIG. 18 is a front view of an injection mold in which the hoop material is accommodated (first embodiment)

Accommodating Step (S150):

FIG. 18 shows an injection mold 52 for injection molding of the housing 6. The injection mold 52 includes a stationary plate 53 and a movable plate 54. The movable plate 54 is vertically movable relative to the stationary plate 53. As shown in FIG. 18, when accommodating the hoop material 50 into the injection mold 52, the hoop material 50 is supported at both ends in the injection mold 52 by using the two fixed parts 30X of the hoop material 50. To be specific, the hoop material 50 is supported at both ends in the injection mold 52 by sandwiching the two fixed parts 30X between the stationary plate 53 and the movable plate 54 in the vertical direction. In the case where the carrier 55 is formed on the hoop material 50 as shown in FIG. 17, it is preferred to sandwich the carrier 55, in addition to the two fixed parts 30X, between the stationary plate 53 and the movable plate 54. Note that since the receptacle 4 in this embodiment includes the two receptacle contact assemblies 7 as shown in FIG. 1, the two hoop materials 50 are simultaneously set in the injection mold 52.

Figure 19:
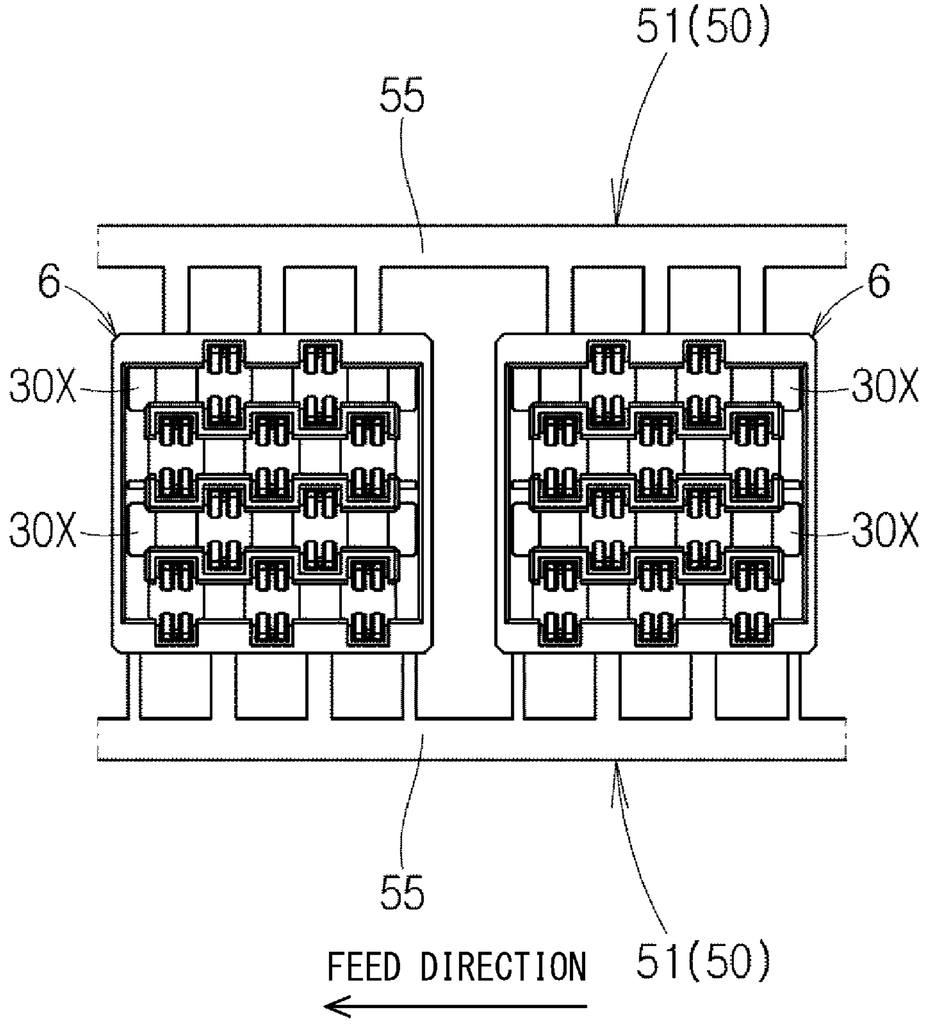
FIG. 19 is a plan view of a receptacle connector before a carrier is removed (first embodiment)

Insert Molding Step (S160):

Then, as shown in FIG. 19, the housing 6 is integrally formed with the two hoop materials 50 by insert molding. After that, the carrier 55 is cut off, and the receptacle 4 is thereby completed. Note that, to increase productivity, housings 6 of a plurality of receptacles 4 are simultaneously molded by using one injection mold 52 as shown in FIG. 19.

The plug 5 is described hereinafter with reference to FIGS. 1, 2, 20 and 21.

Figure 20:
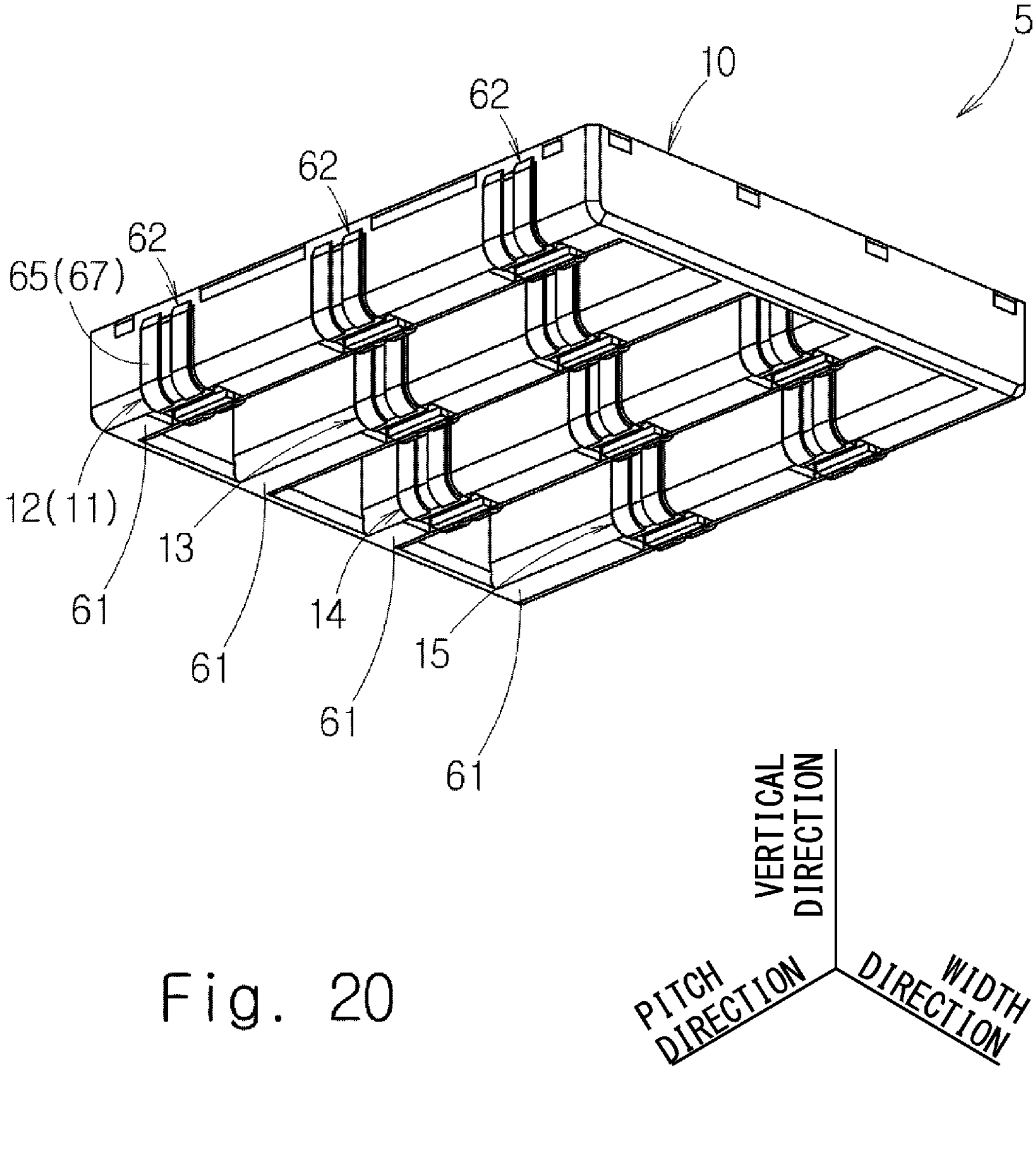
FIG. 20 is a perspective view of a plug connector (first embodiment)

The plug 5 shown in FIGS. 1, 2 and 20 includes a housing 10 made of insulating resin and a plurality of plug contact assemblies 11 integrally formed with the housing 10 by insert molding. The plurality of plug contact assemblies 11 include the first plug contact assembly 12, the second plug contact assembly 13, the third plug contact assembly 14, and the fourth plug contact assembly 15.

Figure 21:
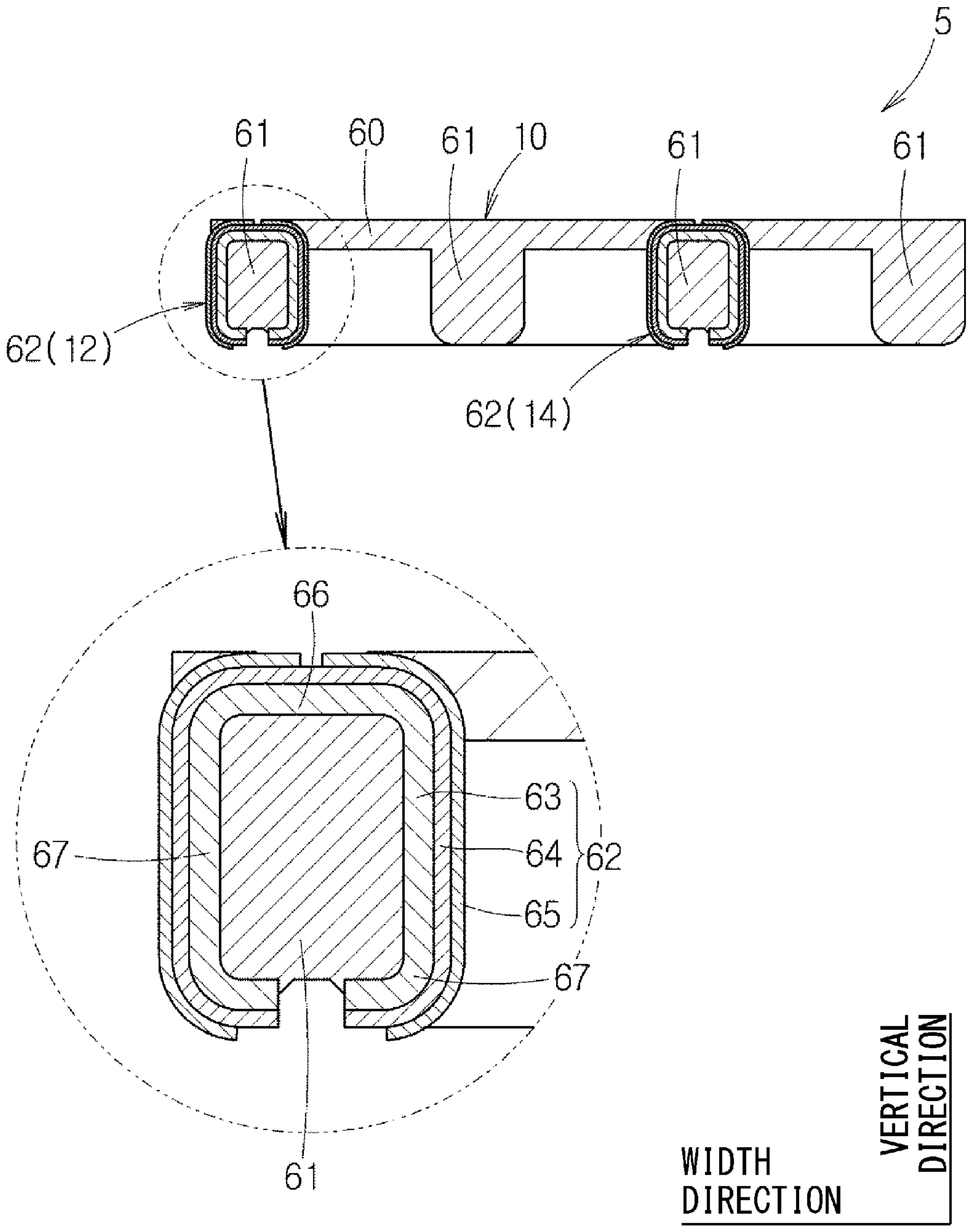
FIG. 21 is a cross-sectional view of the plug connector (first embodiment)

As shown in FIGS. 20 and 21, the housing 10 includes a bottom part 60 and a plurality of ridge portions 61. The bottom part 60 has a flat plate shape, and its thickness direction coincides with the vertical direction. The plurality of ridge portions 61 project downward from the bottom part 60 and extend in the pitch direction.

As shown in FIG. 20, the first plug contact assembly 12 includes three contact units 62. The three contact units 62 correspond to the contact unit 25A, the contact unit 25C, and the contact unit 25E of the first receptacle contact assembly 8 shown in FIG. 5.

As shown in FIG. 21, each contact unit 62 has a trilaminar structure including a base 63, an insulating layer 64, and a plurality of conductive patterns 65.

The base 63 includes a fixed part 66 and four projecting parts 67 projecting from the fixed part 66. The four projecting parts 67 correspond to the four projecting parts 31 of the contact unit 25. FIG. 21 shows only two projecting parts 67 of the four projecting parts 67.

The two projecting parts 67 shown in FIG. 21 respectively project downward from both ends in the width direction of the fixed part 66 and then bend to come closer to each other. The base 63 that constitutes the contact unit 62 is formed to surround the ridge portions 61. Specifically, the two projecting parts 67 are fixed to the ridge portions 61 in such a way that they are not elastically deformable. More specifically, the two projecting parts 67 are fixed to the ridge portions 61 in such a way that they are not relatively displaceable. The same applies to the other two projecting parts 67 of the four projecting parts 67.

The second plug contact assembly 13 includes two contact units 62. The third plug contact assembly 14 includes three contact units 62. The fourth plug contact assembly 15 includes two contact units 62. Each of those contact units 62 has the same structure as the contact unit 62 of the first plug contact assembly 12, and therefore the description thereof is omitted.

In this structure, to mate the plug 5 shown in FIG. 1 with the receptacle 4, the plug 5 is inserted inside the peripheral wall 41 of the receptacle 4. Then, the contact unit 62 shown in FIG. 21 is inserted between the two projecting parts 31 opposed to each other in the width direction of the contact unit 25 shown in FIG. 6 as the two projecting parts 31 recede from each other in the width direction. The four conductive patterns 65 of the contact unit 62 and the four conductive patterns 22 of the contact unit 25 are thereby electrically connected, respectively.

The first embodiment of the present disclosure is described above, and the above-described first embodiment has the following features.

As shown in FIG. 1, the receptacle 4 (connector) includes the housing 6 made of insulating resin and the first receptacle contact assembly 8 (contact assembly) integrally formed with the housing 6 by insert molding. As shown in FIG. 3, the first receptacle contact assembly 8 includes the plurality of contact units 25 arranged in the pitch direction. As shown in FIGS. 3 to 6, each contact unit 25 includes the base 20 made of metal including the flat-plate fixed part 30 fixed to the housing 6 and the four projecting parts 31 projecting upward from the fixed part 30, the insulating layer 21 that covers the base 20, and the four conductive patterns 22 that are formed on the insulating layer, extend from the fixed part 30 to the four projecting parts 31, and function as contacts. As shown in FIG. 5, the fixed parts 30 of the plurality of contact units 25 link together in an unbroken manner in the pitch direction. In this structure, since the plurality of conductive patterns 22 that function as contacts are supported by any of the plurality of fixed parts that link together in an unbroken manner, the relative positional relationship of the plurality of conductive patterns 22 is maintained at high level regardless of the flow of molten resin during insert molding. Compatibility between integrating a housing and a plurality of contacts by insert molding and disposing the plurality of contacts in a fine pitch is thereby achievable.

In this embodiment, each projecting part 31 projects substantially obliquely upward from the fixed part 30 as shown in FIG. 6. Alternatively, each projecting part 31 may project upward or project downward from the fixed part 30. In other words, the projecting direction of each projecting part 31 may be set arbitrarily as long as each projecting part 31 projects at least in the thickness direction of the fixed part 30.

Further, as shown in FIG. 3, although the four projecting parts 31 project from each fixed part 30 in this embodiment, one, two or three projecting parts 31 may project from each fixed part 30, or five or more projecting parts 31 may project from each fixed part 30.

Further, as shown in FIG. 3, each contact unit 25 includes two projecting parts 31 that project from both ends of the fixed part 30 in the width direction orthogonal to the pitch direction. The two projecting parts 31 are opposed to each other in the width direction. In this structure, the two conductive patterns 22 opposed to each other in the width direction are achieved.

Further, as shown in FIG. 4, the two conductive patterns 22 corresponding to the two projecting parts 31 opposed to each other in the width direction are electrically independent of each other. In this structure, the number of cores of the receptacle 4 is enhanced compared with the case where the two conductive patterns 22 corresponding to the two projecting parts 31 opposed to each other in the width direction are electrically short-circuited to each other.

Further, as shown in FIG. 5, the plurality of contact units 25 are disposed in a staggered manner in the pitch direction.

To be specific, the plurality of contact units 25 include the contact unit 25A (first contact unit), the contact unit 25B (second contact unit), and the contact unit 25C (third contact unit) in this recited order in the pitch direction. The contact unit 25A, the contact unit 25B, and the contact unit 25C are disposed in a staggered manner in the pitch direction. The first receptacle contact assembly 8 further includes the coupling beam 26AB (first coupling beam) that couples the fixed part 30 of the contact unit 25A and the fixed part 30 of the contact unit 25B, and the coupling beam 26AC (second coupling beam) that couples the fixed part 30 of the contact unit 25A and the fixed part 30 of the contact unit 25C. This structure allows the plurality of contact units 25 to be tightly coupled to one another.

Further, as shown in FIG. 10, the housing 6 includes the dividing wall 42A that divides the projecting part 31 of the contact unit 25A and the projecting part 31 of the contact unit 25C from the projecting part 31 of the contact unit 25B. This structure prevents abnormal contact between the projecting parts 31 of the contact unit 25A and the contact unit 25C and the projecting part 31 of the contact unit 25C.

Further, as shown in FIG. 6, each projecting part 31 is elastically deformable in the receptacle 4. This structure allows the conductive pattern 22 corresponding to each projecting part 31 to have springiness.

Further, as shown in FIG. 21, each projecting part 31 is elastically deformable in the plug 5. This structure prevents each projecting part 31 from being broken when mating and unmating the plug 5 with the receptacle 4.

Further, as shown in FIG. 6, each conductive pattern 22 is covered with the resist 23 except for a part in the corresponding projecting part 31 and a part in the corresponding fixed part 30. This structure prevents unintended electrical contact of each conductive pattern 22 with another conductive member.

Further, as shown in FIG. 8, the base 20 includes the lower surface 20B (opposed-to board surface) that is opposed to the lower board 2 (board) on which the receptacle 4 (connector) is surface-mounted. The lower surface 20B includes the solder connection part 20S that is exposed toward the lower board 2 without being covered with the housing 6 so that it can be soldered to a ground pattern of the lower board 2. This structure improves signal characteristics of a contact at low cost in a surface-mounting connector where the contact and the housing are integrated by insert molding. The signal characteristics of each conductive pattern 22 are thereby improved at low cost.

Further, as shown in FIG. 6, the conductive pattern 22 includes the first pattern part 22A that is opposed to the fixed part 30 with the insulating layer 21 interposed therebetween and the second pattern part 22B that is opposed to the projecting part 31 with the insulating layer 21 interposed therebetween. As shown in FIGS. 6 to 11, the second pattern part 22B includes the contact pattern part 45 that comes into contact with the contact of the plug 5 (opponent connector) and the extension pattern part 46 that is located between the contact pattern part 45 and the first pattern part 22A. The extension pattern part 46 may include the narrow part 47 that is narrower than the contact pattern part 45. This structure allows an increase in the impedance of the conductive pattern 22 simply by partially reducing the width of the conductive pattern 22. Therefore, the conductive pattern 22 is suitable for adjusting the impedance.

Likewise, the extension pattern part 46 may include the wide part 48 that is wider than the contact pattern part 45. This structure allows a decrease in the impedance of the conductive pattern 22 simply by partially increasing the width of the conductive pattern 22. Therefore, the conductive pattern 22 is suitable for adjusting the impedance.

Further, as shown in FIG. 12, the extension pattern part 46 may have the slit 49 that extends in the longitudinal direction of the extension pattern part 46. This structure contributes to reducing the weight of the receptacle 4 without increasing or decreasing the impedance of the conductive pattern 22.

Further, as shown in FIG. 9, the solder projecting part 20C that projects toward the lower board 2 may be formed on the solder connection part 20S. This structure allows the solder connection part 20S to be easily soldered to the ground pattern of the lower board 2 when there is a gap between the solder connection part 20S and the ground pattern of the lower board 2.

Further, as shown in FIGS. 13 to 19, the manufacturing method of the receptacle 4 includes the laminating step (S100), the conductive pattern formation step (S110), the punching step (S120), the bending step (S140), the accommodating step (S150), and the insert molding step (S160). In the laminating step (S100), an insulating layer is laminated on a hoop material. In the conductive pattern formation step (S110), as shown in FIG. 14, the plurality of conductive patterns 22 to serve as contacts are formed on the insulating layer 51. In the punching step (S120), as shown in FIG. 15, the hoop material 50 is punched in such a way that the hoop material 50 includes the plurality of fixed parts 30 that link together in an unbroken manner in the feed direction of the hoop material 50 and the four projecting parts 31 projecting from each of the fixed parts 30, and each conductive pattern 22 extends from each fixed part 30 to each projecting part 31. In the bending step (S140), as shown in FIG. 17, each projecting part 31 is bent in the thickness direction of the fixed part 30. In the accommodating step (S150), as shown in FIGS. 17 and 18, the hoop material 50 is accommodated into the injection mold 52 in such a way that the hoop material 50 is supported at both ends in the injection mold 52 by using the two fixed parts 30X corresponding to the front end and the back end in the feed direction among the plurality of fixed parts 30 that are remaining in the housing 6 even at the completion stage of the connector. In the insert molding step (S160), the housing 6 is molded integrally with the hoop material 50 by insert molding. In this structure, the accuracy of positions of the plurality of contacts in the injection mold 52 are maintained when integrally forming the plurality of contacts and the housing by insert molding. Further, since the hoop material 50 is supported at both ends in the injection mold 52 by using the plurality of fixed parts 30 that link together in an unbroken manner in the feed direction of the hoop material 50, there is no need to make a special form for supporting at both ends in the punching step (S120) shown in FIG. 15, and therefore the productivity of the punching step (S120) is high.

Further, in the accommodating step (S150), as shown in FIG. 18, the two fixed parts 30X are sandwiched between the stationary plate 53 and the movable plate 54 in the moving direction of the movable plate 54 relative to the stationary plate 53 of the injection mold 52, and thereby the hoop material 50 is supported at both ends in the injection mold 52. In this structure, the hoop material 50 is reliably supported at both ends in the injection mold 52 by using the two fixed parts 30X.

Further, as shown in FIGS. 13 to 16, the manufacturing method of the receptacle 4 further includes the unnecessary projecting part removal step (S130) that removes the four projecting parts 31 projecting respectively from the two fixed parts 30X. This structure contributes to reducing the weight of the first receptacle contact assembly 8, which leads to reducing the weight of the receptacle 4.

Further, as shown in FIG. 5, the first receptacle contact assembly 8 further includes the two supporting parts 27 in a flat-plate shape disposed with the plurality of contact units 25 interposed therebetween in the pitch direction. The two flat-plate supporting parts 27 correspond to the above-described two fixed parts 30X. The two supporting parts 27 link in an unbroken manner with any of the fixed parts 30 of the plurality of contact units 25. The peripheral surface 27P of the first supporting part 27A is a sectional surface except for the connection part 29A with the fixed part 30 of the contact unit 25A which this supporting part 27 links with and the connection part 29B with the fixed part 30 of the contact unit 25B which this supporting part 27 links with. The same applies to the second supporting part 27B. In this structure, since the hoop material 50 is supported at both ends in the injection mold 52 by using those two supporting parts 27 as the two fixed parts 30X shown in FIG. 18, the position of the hoop material 50 in the injection mold 52 is stabilized.

Further, as shown in FIG. 7, the upper surface 27U and the lower surface 27D as both surfaces orthogonal to the thickness direction of the two supporting parts 27 are not covered with the housing 6. In this structure, the first receptacle contact assembly 8 is supported at both ends by sandwiching the two supporting parts 27 between the stationary plate 53 and the movable plate 54 during insert molding.

Further, as shown in FIG. 7, the two supporting parts 27 are fixed to the housing 6. In this structure, the housing 6 is reinforced by the two supporting parts 27. Further, the two supporting parts 27 have the effect of enhancing uniform solidification shrinkage of the housing 6 in the pitch direction because of their uniform cooling in the pitch direction.

Further, as shown in FIG. 7, the two supporting parts 27 have a trilaminar structure in which the insulating layer 21 is interposed between the base 20 and the conductive patterns 22 as two conductive layers, just like the fixed parts 30. In this structure, the fixed part 30 in the contact unit 25 is usable as the supporting part 27 without changing the layer structure of the fixed part 30.

Second Embodiment

A second embodiment will be described hereinafter with reference to FIG. 22. Differences of this embodiment from the above-described first embodiment will be mainly described below, and redundant description will be omitted.

In the above-described first embodiment, as shown in FIG. 3, for example, the contact unit 25 includes four projecting parts 31 and four conductive patterns 22 respectively formed in the four projecting parts 31.

Figure 22:
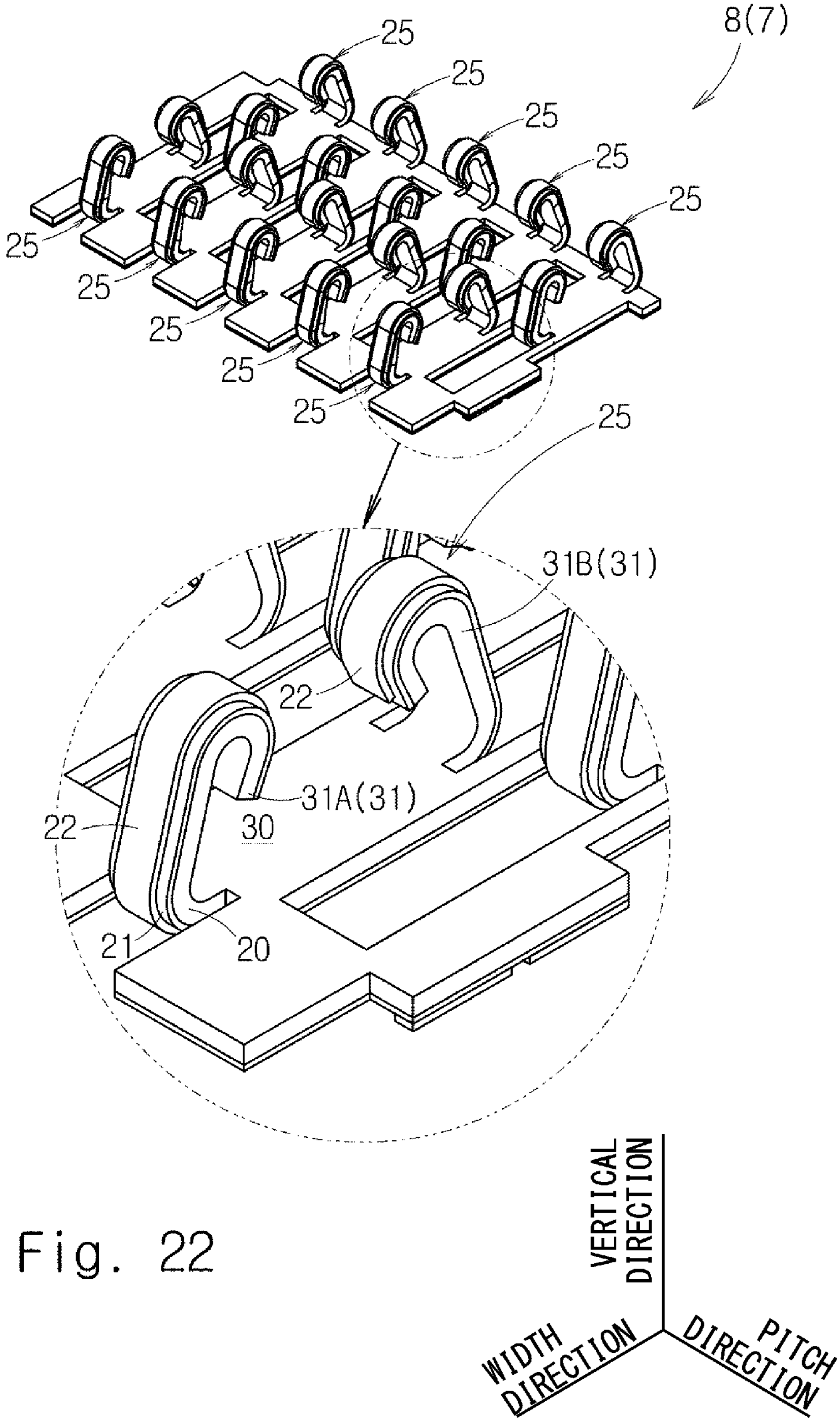
FIG. 22 is a perspective view of a receptacle contact assembly (second embodiment)
Figure 23:
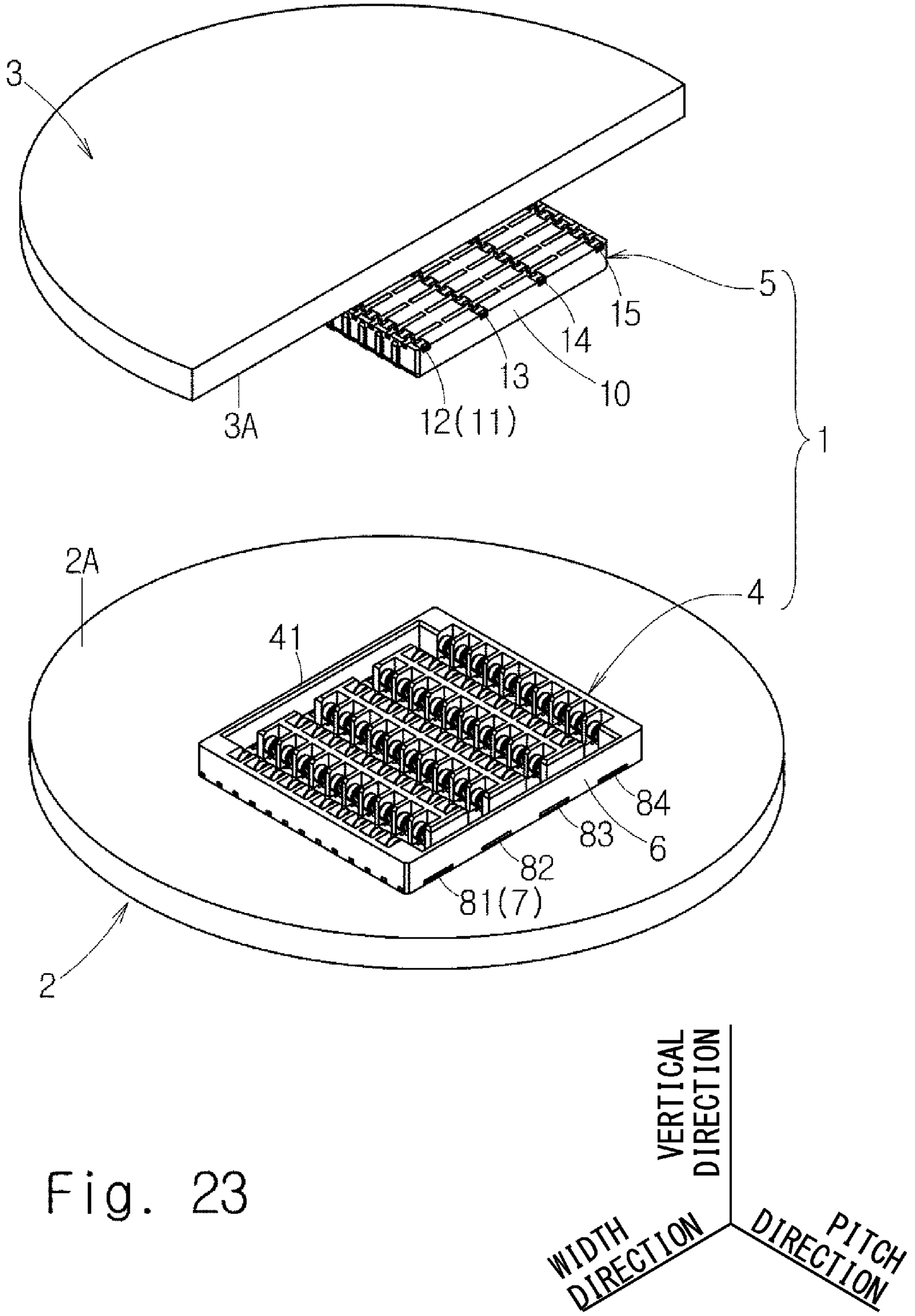
FIG. 23 is a perspective view of a connector assembly (third embodiment)

On the other hand, in this embodiment, as shown in FIG. 22, the contact unit includes two projecting parts 31 and two conductive patterns 22 respectively formed in the two projecting parts 31. The two projecting parts 31 are opposed to each other in the width direction, which is the same as in the above-described first embodiment.

The plug 5 is also different from that in the first embodiment. Specifically, as shown in FIG. 20, for example, the contact unit 62 of the first embodiment includes four projecting parts 67 and four conductive patterns 22 respectively formed in the four projecting parts 67. On the other hand, in this embodiment, the contact unit includes two projecting parts and two conductive patterns respectively formed in the two projecting parts.

Third Embodiment

A third embodiment will be described hereinafter with reference to FIGS. 23 to 28. Differences of this embodiment from the above-described first embodiment will be mainly described below, and redundant description will be omitted.

For example, as shown in FIG. 1, in the above-described first embodiment, the receptacle 4 includes two receptacle contact assemblies 7. On the other hand, in this embodiment, the receptacle 4 includes four receptacle contact assemblies 7. The four receptacle contact assemblies 7 extend in the pitch direction and are disposed at predetermined intervals in the width direction. The four receptacle contact assemblies 7 include a first receptacle contact assembly 81, a second receptacle contact assembly 82, a third receptacle contact assembly 83, and a fourth receptacle contact assembly 84. The first receptacle contact assembly 81, the second receptacle contact assembly 82, the third receptacle contact assembly 83, and the fourth receptacle contact assembly 84 are arranged in this recited order in the width direction.

Figure 24:
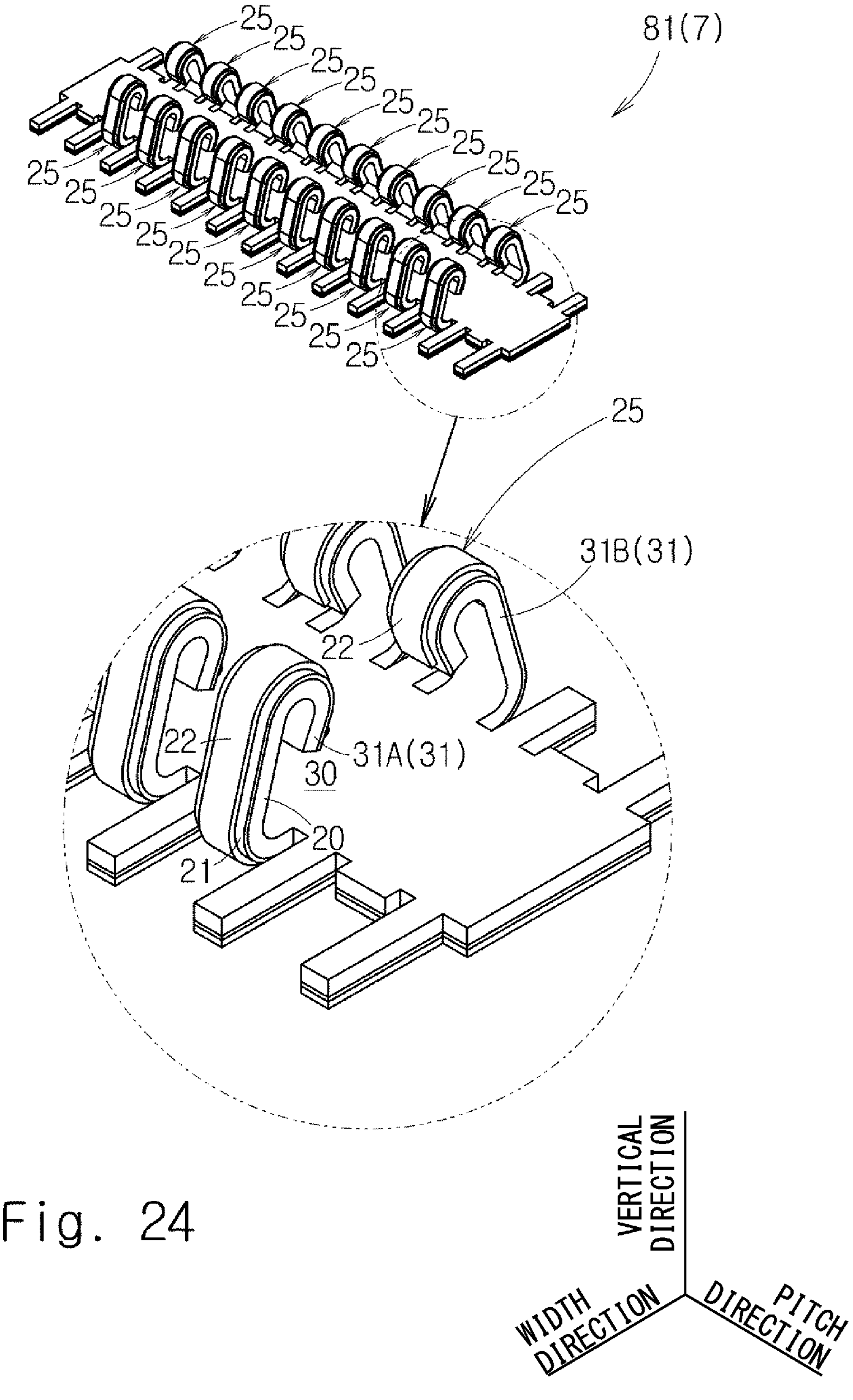
FIG. 24 is a perspective view of a receptacle contact assembly (third embodiment)

Further, as shown in FIG. 3, for example, in the above-described first embodiment, the plurality of contact units 25 are arranged in a staggered manner in the pitch direction. Further, each contact unit 25 includes the four projecting parts 31 and the four conductive patterns 22 respectively formed in the four projecting parts 31. On the other hand, in this embodiment, as shown in FIG. 24, the plurality of contact units 25 are arranged in a row in the pitch direction. Further, each contact unit 25 includes two projecting parts 31 and two conductive patterns 22 respectively formed in the two projecting parts 31.

Figure 25:
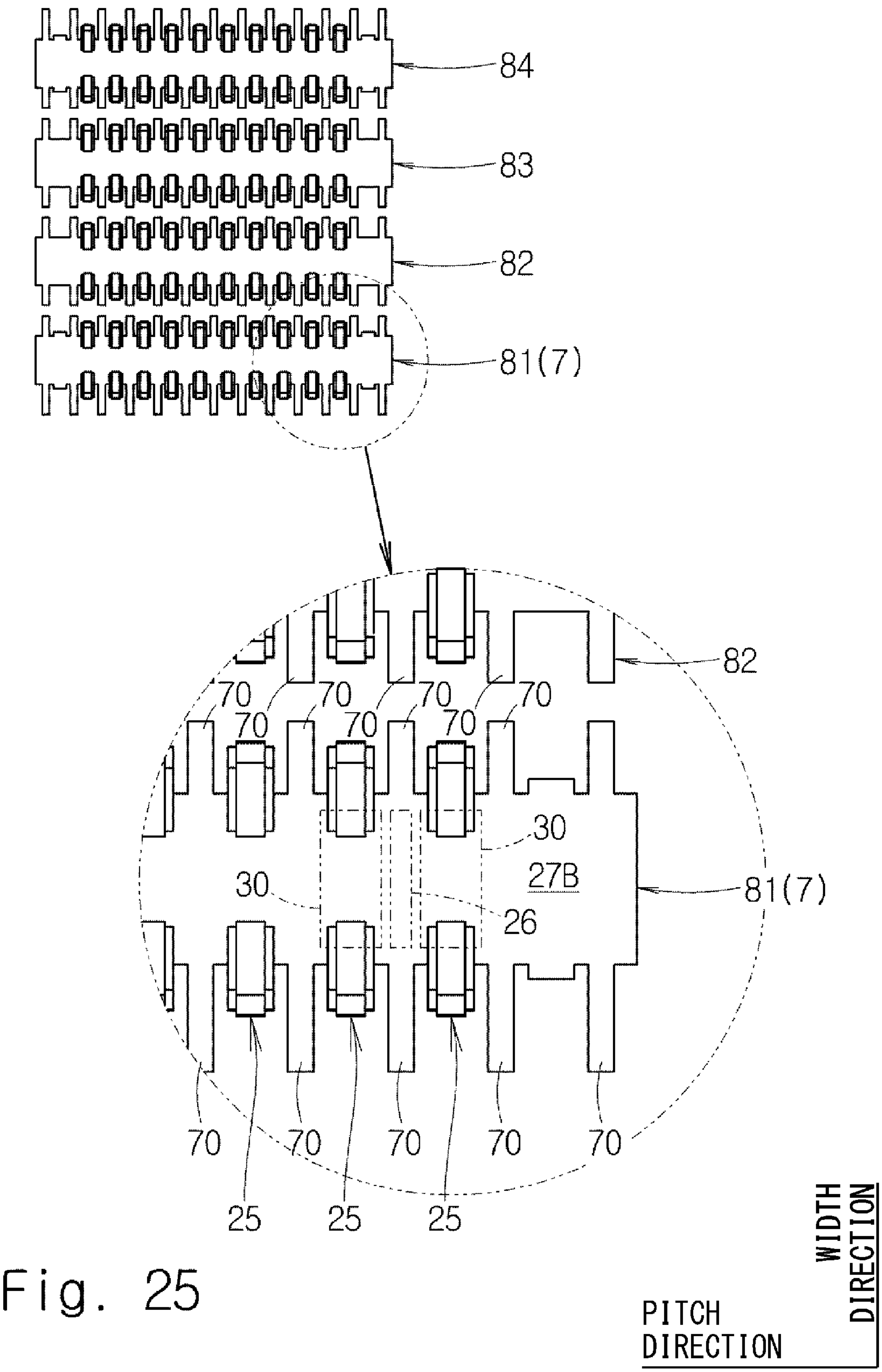
FIG. 25 is a plan view of the receptacle contact assembly (third embodiment)

As shown in FIG. 25, each coupling beam 26 couples the fixed parts 30 of the two contact units 25 adjacent to each other in the pitch direction.

In this embodiment, the contact unit 25 further includes a plurality of shrinkage prevention beams 70. To be specific, two shrinkage prevention beams 70 project in the width direction so as to recede from each other from both ends in the width direction of each coupling beam 26. The plurality of shrinkage prevention beams 70 are fixed to the housing 6. To be specific, the plurality of shrinkage prevention beams 70 are fixed to the housing 6 in such a way that they are not elastically deformable. The plurality of shrinkage prevention beams 70 are fixed to the housing 6 in such a way that they are not movable relative to the housing 6. This structure contributes to enhancing the strength of the housing 6 since the plurality of shrinkage prevention beams 70 are embedded in the housing 6 that fills between the two receptacle contact assemblies 7 adjacent to each other in the width direction. Further, since the plurality of shrinkage prevention beams 70 are embedded in the housing 6 that fills between the two receptacle contact assemblies 7 adjacent to each other in the width direction, the cooling rate of the housing 6 is equalized in the width direction by excellent thermal conduction of each shrinkage prevention beam 70. This prevents the occurrence of a sink mark of the housing 6 and thereby improves the yield of the receptacle 4.

In this embodiment, the plurality of shrinkage prevention beams 70 of the two receptacle contact assemblies 7 adjacent to each other in the width direction are opposed to each other in the width direction. Further, the plurality of shrinkage prevention beams 70 have the same length.

Figure 26:
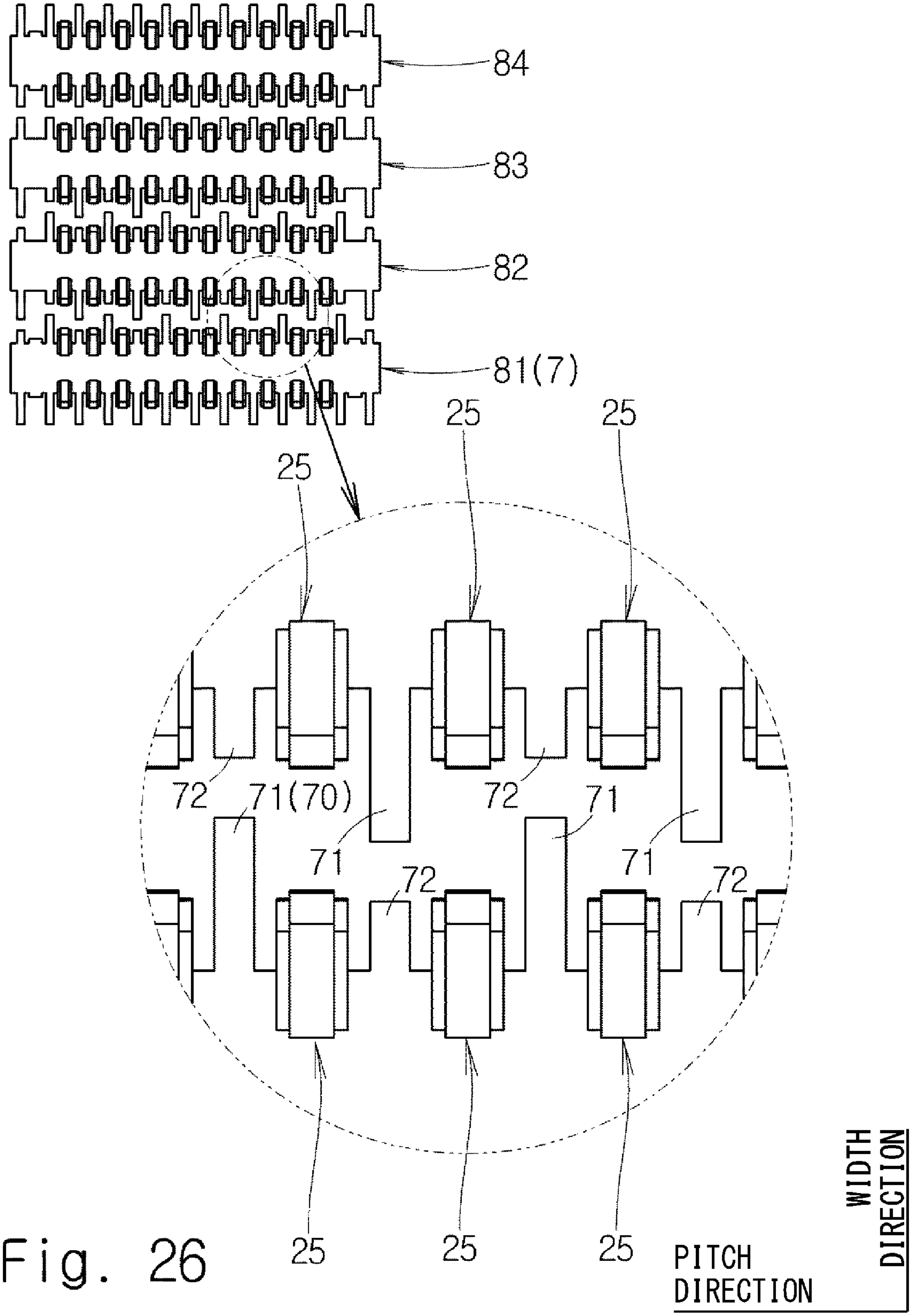
FIG. 26 is a plan view of the receptacle contact assembly (third embodiment)

Alternatively, as shown in FIG. 26, the plurality of shrinkage prevention beams 70 may have a structure in which long shrinkage prevention beams 71 and short shrinkage prevention beams 72 that are shorter than the long shrinkage prevention beams 71 are alternately arranged in the pitch direction. In this case, the two shrinkage prevention beams 70 opposed to each other in the width direction of the two receptacle contact assemblies 7 adjacent to each other in the width direction may be a pair of the long shrinkage prevention beams 71 and the short shrinkage prevention beams 72.

Figure 27:
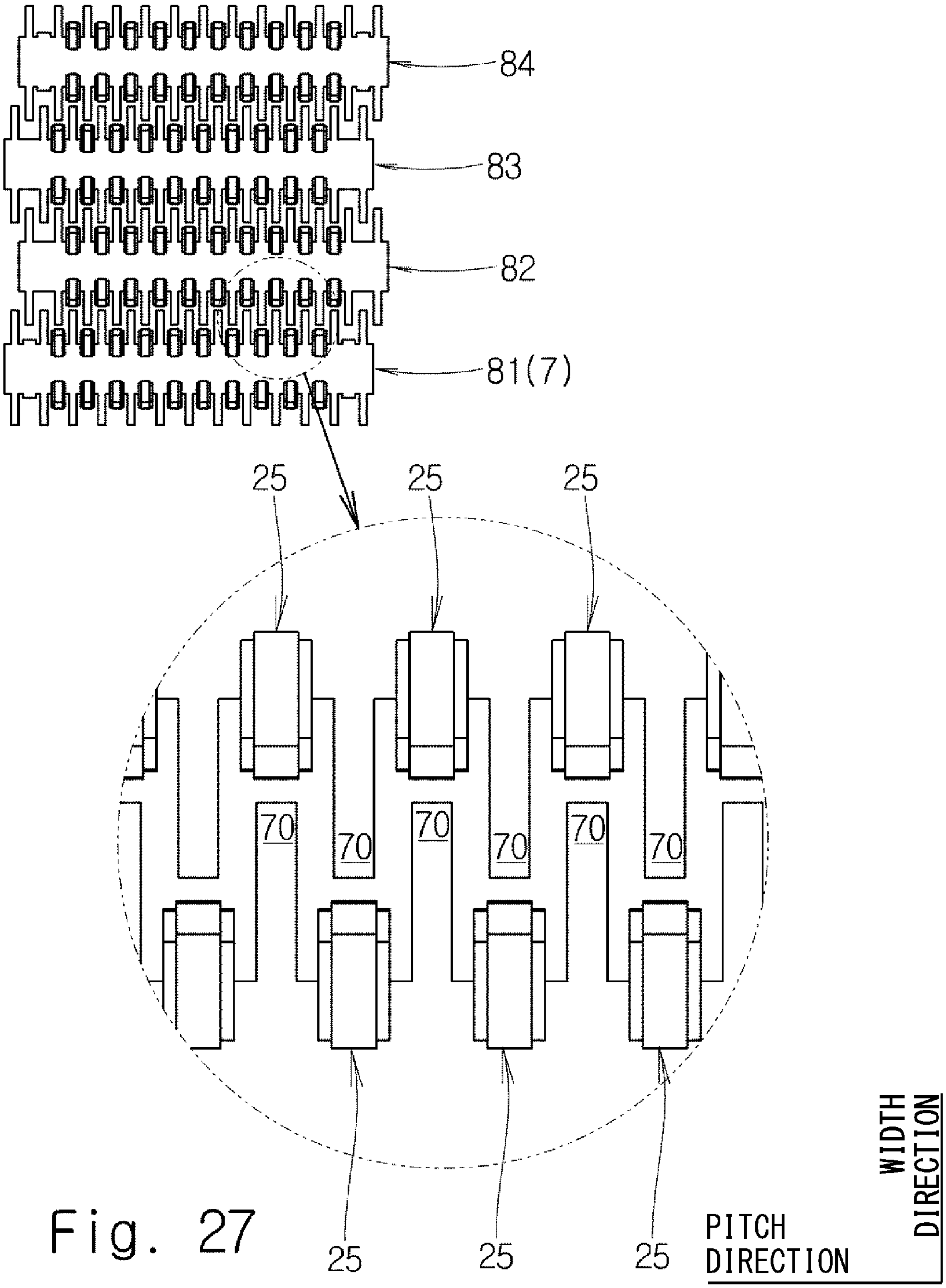
FIG. 27 is a plan view of the receptacle contact assembly (third embodiment)

Alternatively, as shown in FIG. 27, the positional relationship in the pitch direction of the two contact units 25 adjacent to each other in the width direction may be slightly shifted, so that the plurality of shrinkage prevention beams 70 of one contact unit 25 and the plurality of shrinkage prevention beams 70 of the other contact unit 25 are opposed to each other in the pitch direction rather than opposed to each other in the width direction.

Figure 28:
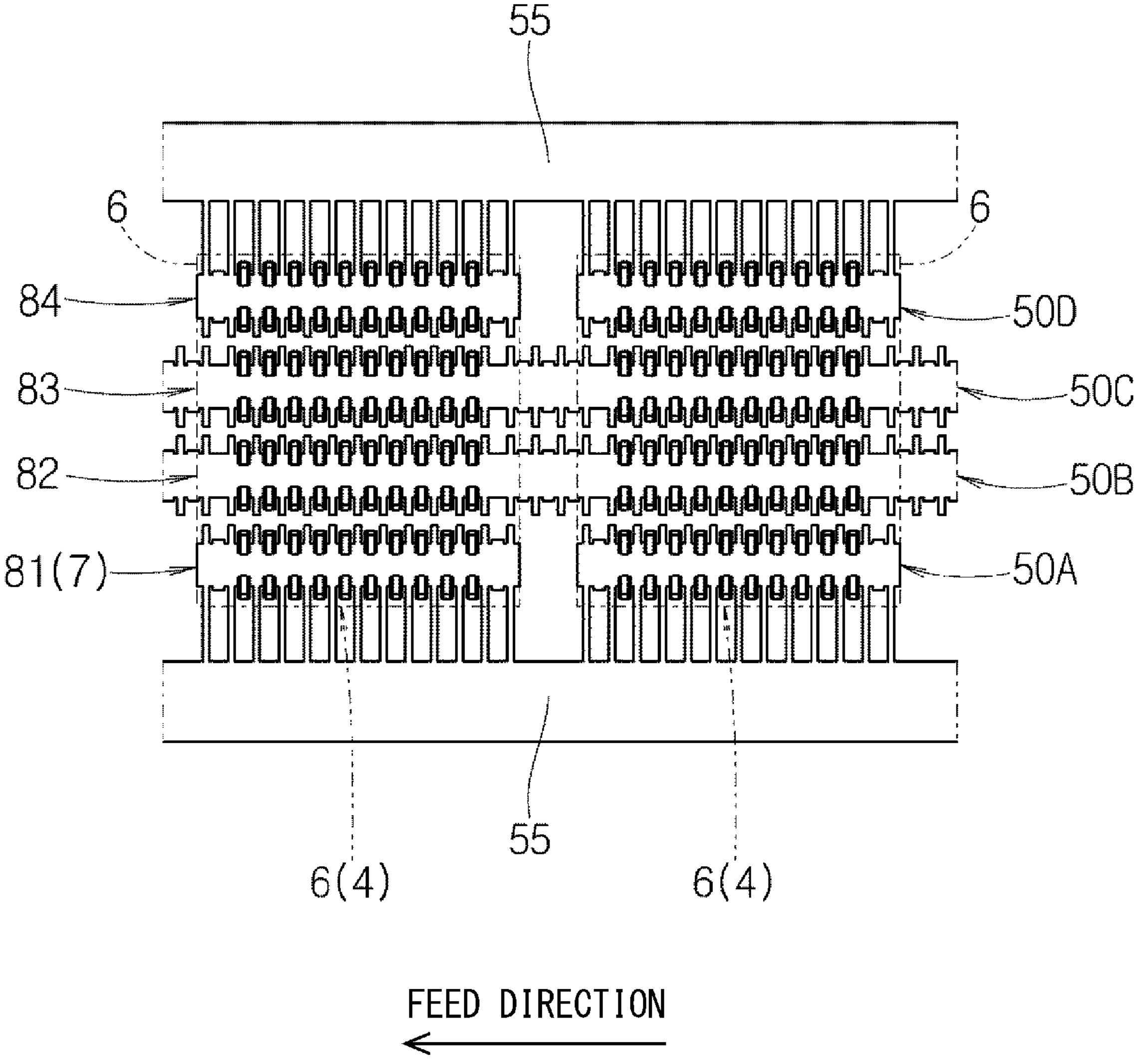
FIG. 28 is a plan view showing a plurality of hoops (third embodiment)
Figure 29:
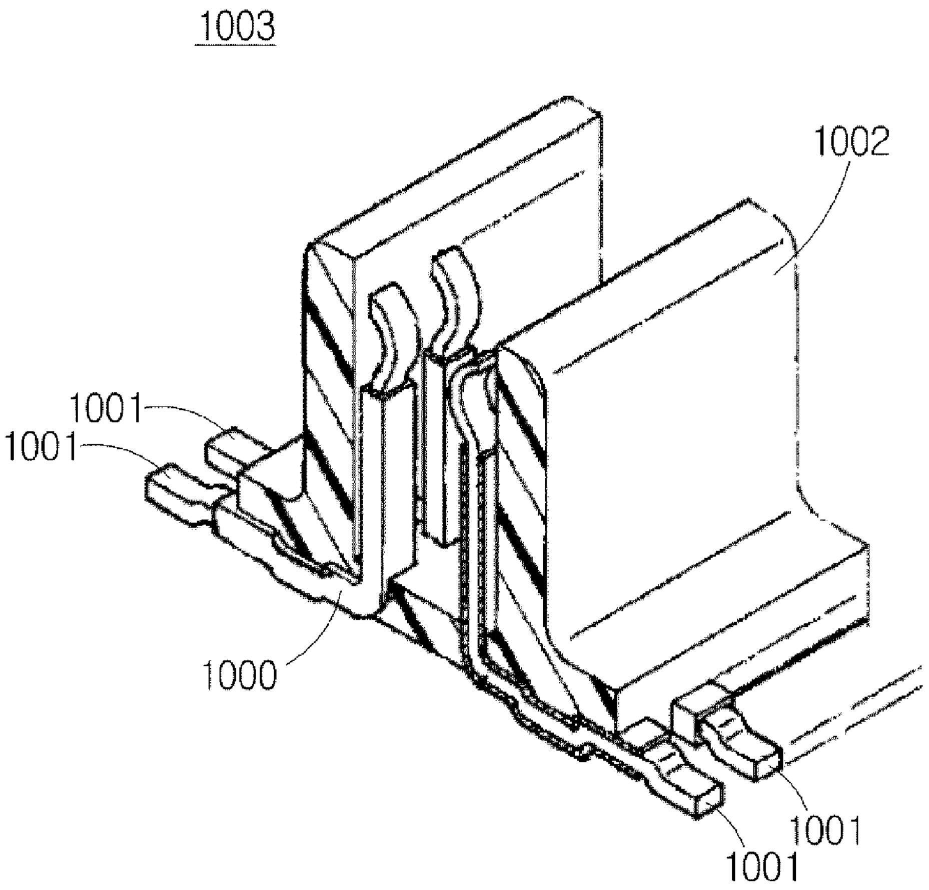
FIG. 29 is a simplified drawing of FIG. 1 of Patent Literature 1.

FIG. 28 shows the way of forming the housings 6 of the plurality of receptacles 4 simultaneously by insert molding. As shown in FIG. 28, a hoop material 50A corresponding to the first receptacle contact assembly 81, a hoop material 50B corresponding to the second receptacle contact assembly 82, a hoop material 50C corresponding to the third receptacle contact assembly 83, and a hoop material 50D corresponding to the fourth receptacle contact assembly 84 are simultaneously set in the injection mold 52. At this time, as shown in FIG. 28, since the hoop material 50B and the hoop material 50C are located between the hoop material 50A and the hoop material 50D in the width direction, the hoop material 50B and the hoop material 50C cannot be supported by the carrier 55. Thus, it is preferred that the hoop material 50B and the hoop material 50C are joined to each other in the feed direction of the hoop material 50 without being cut for each receptacle 4 during insert molding. On the other hand, the hoop material 50A and the hoop material 50D can be supported by the carrier 55, and therefore they may be separated for each receptacle 4 during insert molding.

The third embodiment is described above, and the above-described embodiment has the following features.

As shown in FIG. 25, the plurality of contact units 25 are arranged in a row in the pitch direction.

The receptacle contact assembly 7 includes the coupling beam 26 (coupling parts) that couples the fixed parts 30 of the two contact units 25 adjacent to each other in the pitch direction among the plurality of contact units 25 and the two shrinkage prevention beams 70 that project from the coupling beam 26 in the width direction orthogonal to the pitch direction and are fixed to the housing 6. This structure contributes to reinforcement of the housing 6 and prevention of a sink mark.

Note that only one shrinkage prevention beam 70, instead of two shrinkage prevention beams 70, may project from the coupling beam 26.

Further, the receptacle contact assembly 7 includes two shrinkage prevention beams 70 that project in the width direction so as to recede from each other from both ends in the width direction of the coupling beam 26. This structure further contributes to reinforcement of the housing 6 and prevention of a sink mark.

The first to third embodiments can be combined as desirable by one of ordinary skill in the art.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A connector comprising:

a housing made of insulating resin; and a contact assembly integrally formed with the housing by insert molding, wherein the contact assembly includes a base made of metal including a fixed part in a flat-plate shape fixed to the housing and a projecting part projecting from the fixed part at least in a thickness direction of the fixed part, an insulating layer covering the base, and a conductive pattern formed on the insulating layer, extending from the fixed part to the projecting part of the base, such that the conductive pattern is spaced from the fixed part of the base and spaced from the projecting part of the base by the insulating layer, the conductive pattern functioning as a contact, the base includes an opposed-to board surface opposed to a board on which the connector is surface-mounted, and the opposed-to board surface includes a solder connection part exposed toward the board without being covered with the housing so as to be soldered to a ground pattern of the board.

2. The connector according to claim 1, wherein the conductive pattern includes a first pattern part opposed to the fixed part with the insulating layer interposed therebetween, and a second pattern part opposed to the projecting part with the insulating layer interposed therebetween, the second pattern part includes a contact pattern part to come into contact with a contact of an opponent connector, and an extension pattern part located between the contact pattern part and the first pattern part, and the extension pattern part includes a narrow part narrower than the contact pattern part.

3. The connector according to claim 1, wherein the conductive pattern includes a first pattern part opposed to the fixed part with the insulating layer interposed therebetween, and a second pattern part opposed to the projecting part with the insulating layer interposed therebetween, the second pattern part includes a contact pattern part to come into contact with a contact of an opponent connector, and an extension pattern part located between the contact pattern part and the first pattern part, and the extension pattern part includes a wide part wider than the contact pattern part.

4. The connector according to claim 1, wherein the conductive pattern includes a first pattern part opposed to the fixed part with the insulating layer interposed therebetween, and a second pattern part opposed to the projecting part with the insulating layer interposed therebetween, the second pattern part includes a contact pattern part to come into contact with a contact of an opponent connector, and an extension pattern part located between the contact pattern part and the first pattern part, and the extension pattern part has a slit extending in a longitudinal direction of the extension pattern part.

5. The connector according to claim 1, wherein a solder projecting part projecting toward the board is formed on the solder connection part.

* * * * *